United States Patent [19]

Hermann et al.

[11] Patent Number: 5,764,541
[45] Date of Patent: Jun. 9, 1998

[54] MICROPROCESSOR CONTROLLED SENSOR SIGNAL CONDITIONING CIRCUIT

[75] Inventors: Juergen Hermann, Fuerstentum, Liechtenstein; Richard Bruce Kash, Los Altos Hills, Calif.

[73] Assignee: Hermann Finance Corporation Ltd., Virgin Islands (Br.)

[21] Appl. No.: 575,792

[22] Filed: Dec. 22, 1995

(Under 37 CFR 1.47)

[51] Int. Cl.$^6$ .................................................. G01C 25/00
[52] U.S. Cl. .................................... 364/571.01; 341/167
[58] Field of Search .................. 364/571.01–571.07, 364/573, 575, 558; 73/763–766; 341/118–129, 138–140, 144, 145, 166, 151, 155, 156, 159, 164, 168, 169, 170, 167; 327/100, 160, 339

[56] References Cited

U.S. PATENT DOCUMENTS

| | | | |
|---|---|---|---|
| 3,701,142 | 10/1972 | Cannava | 341/167 |
| 4,107,667 | 8/1978 | Kronlage | 341/167 |
| 4,192,005 | 3/1980 | Kurtz | 364/558 |
| 4,243,975 | 1/1981 | Masuda et al. | 341/168 |
| 4,357,600 | 11/1982 | Ressmeyer | 341/129 |
| 4,484,177 | 11/1984 | Jubbagy | 341/167 |
| 4,596,977 | 6/1986 | Bauman et al. | 341/167 |
| 5,121,118 | 6/1992 | Hermann | 341/118 |
| 5,262,780 | 11/1993 | Gray | 341/166 |

*Primary Examiner*—James P. Trammell
*Attorney, Agent, or Firm*—Law Offices of Robert Sabath

[57] ABSTRACT

A method and apparatus for measurement signal compensation comprises providing an analog-to-digital converter that includes a dual slope integrator. A microprocessor controls the reference voltage applied to the integrator. An amplifier having a switchable gain, controls the amplification of the input signal to the integrator during the various phases of integration. An off-set compensation value is stored in a memory device for providing off-set compensation by charging a capacitor connected to the integrator. A full-scale rough adjust value is also stored on the memory device and is used as a specific reference to produce a reference voltage that is, in turn, used in the integrator during the negative slope phase. During the positive slope phase, the integration time is controlled by means of full-scale fine adjust values. The temperature dependent full-scale fine adjust values are produced from the preprogrammed values in memory by using interpolation techniques. For example, in the case of a piezo-resistive pressure sensor application, the temperature sensing is undertaken by intermittently sensing the temperature of the measuring circuitry using an on-chip temperature sensor, or the temperature at the top of the sensor bridge using the pressure sensors, or by using external temperature sensors. Pressure measurement depends on the plus and minus outputs of the sensor bridge, and measurement is performed by appropriately adjusting the integrator to provide for temperature compensation during the analog-to-digital conversion process.

58 Claims, 10 Drawing Sheets

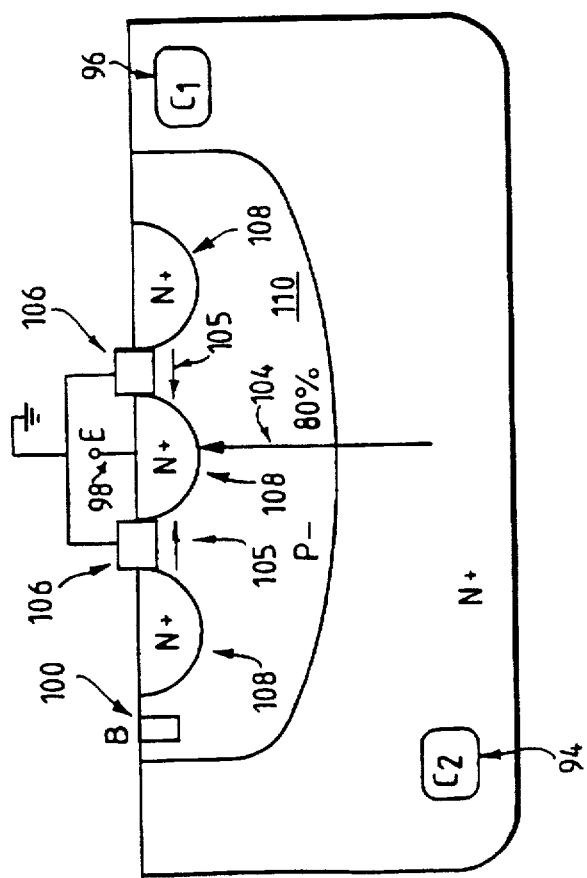
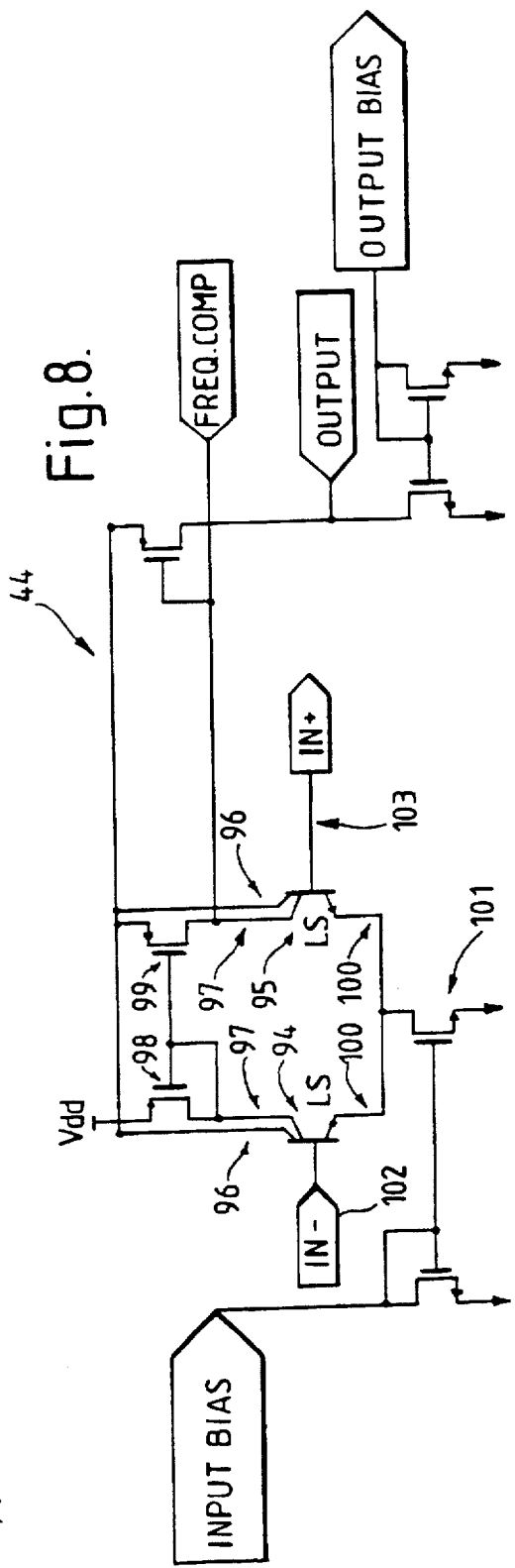

Legend
1. INIT SSC-04
2. Calib. TEMP.-Current
3. Calib. OFFSET rough
4. Calib. FS rough
5. Calib. ADC clock
6. Calib. FS fine at T1
7. Read TEMP T1
8. Read PRES P1
9. Read PRES P2
10. Read PRES P3
11. Read PRES P4

12. Calib. FS fine at T2
13. Read TEMP T2
14. Read PRES P1
15. Read PRES P2
16. Read PRES P3
17. Read PRES P4

18. Calib. FS fine at T3
19. Read TEMP T3
20. Read PRES P1
21. Read PRES P2
22. Read PRES P3
23. Read PRES P4

MICROPROCESSOR CONTROLLED SENSOR SIGNAL CONDITIONING CIRCUIT

FIELD OF THE INVENTION

The invention relates to a process and a device for measuring analog signals and compensating for measurement errors. In particular it relates to a piezo-resistive pressure sensor or any other resistive sensor or sensors with a DC voltage output which has to be converted to digital value.

BACKGROUND OF THE INVENTION

Sensors in the form of piezo-resistive sensors are known, and have been incorporated in bridge circuits for measuring pressure changes. Inaccuracies in the components used in the bridge circuits and temperature fluctuations may cause erroneous readings. Typical errors include null point displacement and scattering of the measurement value caused by varying resistance values in the arms of the measurement bridge. Temperature fluctuations can cause additional errors by displacing the null point and affecting the sensitivity of the bridge. Linearity errors due to non-linear characteristics of the components, further influence the accuracy of the results. Production tolerances in the manufacture of the various components affect their relative sensitivities and the null point of the sensor bridge. The null point is further influenced by long-term instabilities which become increasingly significant through long-term operation of the device.

Various compensation circuits have been devised. One of these is the circuit disclosed in U.S. Pat. No. 4,192,005 which allows temperature to be compensated for. In this circuit a compensation of the analog signal is proposed prior to its conversion in an ADC. Compensation circuits of this nature involve trimming of the sensor bridge itself or of the subsequent amplifiers. The problem with this kind of circuit is that compensation is based on the results obtained and does not provide sufficiently accurate results.

In another type of compensation circuit the analog signal is first digitized. The problem with this approach is that the entire signal, including errors is digitized from the outset. Due to the limited range of the ADC, there is a loss in the ADC resolution. Furthermore, a large number of storage registers (RAM) and program code storage means (ROM) are required to facilitate the processing of the digital signal.

An improved circuit is disclosed in EP-A 0169414. In the circuit the analog signal is further processed in analog form by means of a digital compensation circuit. The analog signal is digitized and the digitized values used to address prestored compensation values for adjusting the power supply to the measurement bridge and/or the amplification of the downstream operational amplifiers. This circuit permits temperature compensation, zero point, and linearity compensation to be undertaken. Accuracy is, however, limited due to the quantization error of the digital adjustment of the analog output signal. The problem with analog compensation using an operational amplifier is that relatively large power signals, in the mA range, are required to minimize the relative effect of noise. Any further processing (digitizing) therefore requires a separate analog-digital converter and a microprocessor. Furthermore, numerous costly steps are involved in the calibration of such a system.

Thus, signal shaping undertaken before the analog-digital conversion requires an additional amplification of the analog signal, thereby increasing the power consumption and additional circuitry which has to be manually adjusted. The additional amplification also leads to further errors which are not correctable. On the other hand, compensation of the measurement signal after the analog-digital conversion leads to a clipping of the original measurement signal.

A further prior arts device is that disclosed in U.S. Pat. No. 5,121,118 of which Mr. Hermann, one of the inventors of the pressent application, is the inventor. U.S. Pat. No. 5,121,118 discloses an apparatus for measurement signal compensation involving an analog-to-digital convertor operating in a dual slope integration mode with means for providing zero point compensation and manipulation of the reference voltage and of the integration time. It thus provides an improved apparatus for signal compensation in which compensation takes place during the analog-to-digital conversion process. It however suffers from a number of drawbacks, including limited accuracy and ADC resolution as well as the need for multiple power supplies.

OBJECTS AND SUMMARY OF THE INVENTION

It is an object of the invention to avoid the use of discrete compensation components requiring high tolerances and arrays of manually matched, highly critical sensor reference supplies. It is an object of the invention to include all sensor interfaces on a single chip. It is a further object of the invention to provide a sensor-signal conditioning circuit, for example a pressure sensing circuit, having a single power supply input.

It is yet a further object of the invention that sensor error compensation is performed by software for increased versatility.

It is a further object of the invention to avoid a multitude of amplifiers, each with an individually tweaked offset and gain. It is also an object of the invention to avoid the need for costly, high power, high resolution analog-to-digital converters.

It is an object of the invention to eliminate the need for individual trimming of calibration resistors and resistor merging, and to avoid unnecessary components for error curve compensation and expensive sensor precalibration. It is a further object of the invention to provide a sensor-signal conditioning circuit that is self calibrating and fully programmable to perform the sensor error compensation under software control.

It is a further object of the invention to provide a sensor-signal conditioning circuit, for example a pressure sensing circuit, providing compensation for the various temperature-related errors, production tolerances, and long term errors mentioned above. In particular, it is an object of the invention to measure temperature using the pressure sensor bridge resistance change, and using such temperature values to provide pressure signal compensation. It is another object of the invention to include an on chip temperature gauge.

It is yet another object of the invention to adjust the sensor output signal by providing a programmable current source or voltage source for directly supplying the resistive sensor.

It is yet another object of the invention to provide a low noise buffer/amplifier with programmable gain control. It is yet a further object of the invention to reduce the buffer/amplifier noise by providing a low noise lateral NPN device as front end for the buffer/amplifier on the same CMOS IC to obtain an overall improvement in noise.

It is a further object of the invention to provide a sensor-signal conditioning circuit, for example a pressure sensing circuit, which includes a programmable dual-slope integrator.

It is yet a further object of the invention to provide a sensor-signal conditioning circuit, for example a pressure sensing circuit, in which the offset and full scale are compensated for in the analog-digital converter itself. Particularly, it is an object of the invention to provide a capacitor in the analog-digital converter for storing the analog offset value. It is a further object of the invention to adjust the ramp height during the positive slope phase of integration by adjusting the counter, and to adjust the gradient during the negative slope phase by adjusting the magnitude of the reference voltage to the integrator.

According to the invention there is provided an apparatus for measurement signal compensation comprising: an analog-to-digital converter operating in a dual slope integration mode, the converter including an integrator having a first input port for selectively receiving either the analog measurement signal or a reference voltage, and a second input port for receiving a control voltage, the converter further including a comparator connected to an output of the integrator, and a counter for controlling the number of steps during the positive slope phase of integration; a controller connected to the first input port of the integrator for providing the reference voltage to the integrator during a negative slope phase of integration; and an amplifier having a switchable gain, an output of the amplifier being connected to the first input port of the integrator, wherein the controller includes a microprocessor.

The controller can include a data memory connected to the microprocessor, and wherein the apparatus further comprises a digital-to-analog converter for producing the reference voltage in response to a digital value supplied from the data memory. The memory can be connected to the digital-to-analog converter and the data stored in the memory can include a digital off-set compensation value, a preprogrammed full-scale rough adjust value, and preprogrammed full-scale fine adjust values. The digital off-set compensation value and the preprogrammed full-scale rough adjust value can each comprise an 8-bit word, and the preprogrammed full-scale fine adjust values can comprise 12-bit words. The reference voltage can correspond to the 8-bit digital full-scale rough adjust value supplied from memory to provide for full-scale rough adjust of the integrator.

Full-scale fine adjust values can be calculated by interpolation from the preprogrammed full-scale fine adjust values, and used for adjusting the number of steps counted by the counter.

The first input port of the integrator can include a capacitor which is charged to an off-set compensation voltage corresponding to the digital off-set compensation value.

At least one sensor can be connected in an associated bridge circuit, wherein the measurement signal is derived from the at least one bridge circuit. A programmable current source or voltage source can be connected to one of the at least one sensor. The apparatus can include a plurality of sensors and a switch for selectively connecting the current source or voltage source to any one of the plurality of sensors. The programmable current source or voltage source can include a step selector. A plurality of current sources or voltage sources can be connected to each sensor, and the programmable current sources or voltage sources can each include a step selector.

The value of the step selector at a predetermined minimum temperature for which an output signal can be obtained from the comparator, is stored in memory.

The preprogrammed full-scale fine adjust values can correspond to compensation values obtained for predetermined temperatures and pressures.

The microprocessor is typically programmed to calculate temperature and pressure compensation values by interpolation using preprogrammed full-scale fine adjust values stored on the data memory.

A multiplexer can be connected between the memory and the digital-to-analog converter for transmitting either the off-set compensation value or the full-scale rough adjust value to the digital-to-analog converter.

The memory can comprise an electrically erasable and programmable read-only memory device.

The amplifier can comprise a buffer/amplifier having a lateral NPN buffer preceding a CMOS device, and formed on the same CMOS semiconductor device.

The apparatus can comprise super charge switch means for rapidly stabilizing the apparatus during neutral phases of integration and when switching between different signals.

Further, according to the invention there is provided an apparatus for processing analog measurement signals comprising: an analog-to-digital converter that includes a dual slope integrator operated in the negative slope phase with a full-scale rough adjust reference voltage; a storage unit for storing a full-scale rough adjust reference value corresponding to the full-scale rough adjust reference voltage; a digital-to-analog converter connected between the storage unit and the integrator; and a switchable gain amplifier connected to the integrator for amplifying the analog measurement signals during the positive slope phase of the integration.

An off-set compensation value can be stored in the storage unit, and the analog-to-digital converter can include an off-set compensation voltage storage capacitor for compensating, during a neutral phase of the integration, for the voltage off-set, the off-set compensation voltage storage capacitor receiving a voltage related to the off-set compensation value.

The apparatus can further comprise a multiplexer having an output connected to the digital-to-analog converter, and an input connected to the storage unit.

The apparatus can further comprise a microprocessor interface for connecting an external microprocessor.

The apparatus can further include a controlling means for controlling the transmission of the off-set compensation value for the off-set compensation voltage storage capacitor, and the transmission of full-scale rough adjust reference value.

Still further, according to the invention, there is provided an apparatus for processing analog measurement signals comprising: an analog-to-digital converter that includes a dual slope integrator; a counter means for controlling the number of integration steps during the positive slope phase of integration; a storage unit for storing preprogrammed full-scale fine adjust values; a controller for calculating specific compensation values from the preprogrammed full-scale fine adjust values, to control the number of integration steps of the counter; and a switchable gain amplifier connected to the integrator for amplifying the analog measurement signals during the positive slope phase of the integration.

The apparatus can comprise a programmable clock connected to the counter means for adjusting the frequency of the counter means.

Still further, according to the invention, there is provided a method for measurement signal compensation, comprising: providing an analog-to-digital converter that includes a dual slope integrator having an input port for receiving an analog measurement signal and a comparator connected to an output of the integrator; providing, by means of a counter, a selectable time of integration during a positive slope phase of integration; applying a full-scale rough adjust reference voltage to the input port of the integrator during a negative slope phase of integration; and adjusting the amplification of the signal applied to the input port of the integrator during the positive slope phase.

The method can include the full-scale rough adjust reference voltage applied to the input port under programmable microprocessor control.

The method can further comprise: providing, under programmable microprocessor control, a predetermined off-set compensation voltage to the input port of the integrator for setting the integration starting point.

Digital data can be provided under control of a microprocessor from a data memory, and the data can include an off-set compensation value representative of the off-set compensation voltage, preprogrammed full-scale fine adjust values for adjusting the time of integration during the positive slope phase, and a preprogrammed reference value for use in providing the full-scale rough adjust reference voltage to the integrator.

The off-set compensation value can be converted to the off-set compensation voltage, and the reference value can be converted to the full-scale rough reference voltage in a digital-to-analog converter before being applied to the integrator.

The method can further comprise a calibration phase, during which the preprogrammed full-scale fine adjust values and the preprogrammed reference value are stored in the data memory, the data memory can comprise an electrically erasable and programmable read-only memory device.

The off-set compensation voltage can be applied to the integrator by charging a capacitor connected to the input port.

The method can further include the step of calculating specific full-scale fine adjust values from the preprogrammed full-scale fine adjust values by interpolation.

The interpolation can be a polynomial interpolation using the equation:

$$Y=L0*Y0+L1*Y1+L2*Y2+L3*Y3$$

wherein L0, L1, L2 and L3 are:

$$L0 = \frac{(X-X1)*(X-X2)*(X-X3)}{(X0-X1)*(X0-X2)*(X0-X3)}$$

$$L1 = \frac{(X-X0)*(X-X2)*(X-X3)}{(X1-X0)*(X1-X2)*(X1-X3)}$$

$$L2 = \frac{(X-X0)*(X-X1)*(X-X3)}{(X2-X0)*(X2-X1)*(X2-X3)}$$

$$L3 = \frac{(X-X0)*(X-X1)*(X-X2)}{(X3-00)*(X3-X1)*(X3-X2)}$$

The preprogrammed full-scale fine adjust values reference values can be preprogrammed compensation values obtained for various predetermined temperatures and pressures.

The measurement signal can be derived from a sensor in a bridge circuit, the method further comprising: gradually increasing the current supplied to the bridge circuit at a predetermined minimum temperature, until a signal is obtained from the comparator, the magnitude of the current being representative of a component error compensation voltage.

Data corresponding to the current supplied to the bridge circuit can be stored in the data memory as a component error compensation value.

The method can further include the step of multiplexing the transmission of the digital data to a digital-to-analog converter for selectively providing to the digital-to-analog converter, the off-set compensation value or the preprogrammed reference value.

The method can further provide a pressure sensor, wherein the preprogrammed full-scale fine adjust values are determined during the calibration phase by exposing the pressure sensor to predetermined temperature and pressure variations.

The analog-to-digital converter can be operated in a temperature sensing mode to obtain temperature measurements, and in a pressure sensing mode to obtain pressure measurements. The values obtained in one mode, can be used in calculating the specific full-scale fine adjust value in the subsequent mode.

The temperature sensing mode and pressure sensing mode are engaged at pre-determined intervals or by means of a control switch when desired. The temperature sensing mode can, for example, be engaged one to three times every minute, and the pressure mode can be engaged one to 2 times every second.

The analog-to-digital converter can be operated in a temperature sensing mode and a pressure sensing mode, wherein the method can include a current saving technique in which current is supplied to the sensor only during the positive slope phase of integration.

The method can further comprise employing super charge techniques during neutral slope phases to facilitate a high rate of measurement signal compensations.

The method can further comprise calibrating the clock to achieve a minimum predetermined integrator ramp height, and wherein the calibration of the clock can include adjusting the clock frequency to obtain a desired frequency and storing the desired frequency in the data memory.

The digital-to-analog converter can operate in a power supply sensing mode at predetermined intervals or when desired to compensate for variations in power supplied to the converter. The specific power supply compensation values can be calculated by interpolation from preprogrammed power supply compensation values stored in the date memory, for compensating for variations in the power supplied to the converter.

BRIEF DESCRIPTION OF THE DRAWINGS

FIG. 7 is a representation of a lateral NPN buffer for use in one embodiment of the invention;

FIG. 8 is a schematic representation of a lateral NPN bipolar transistor stage;

DETAILED DESCRIPTION OF THE INVENTION

Figure 1:
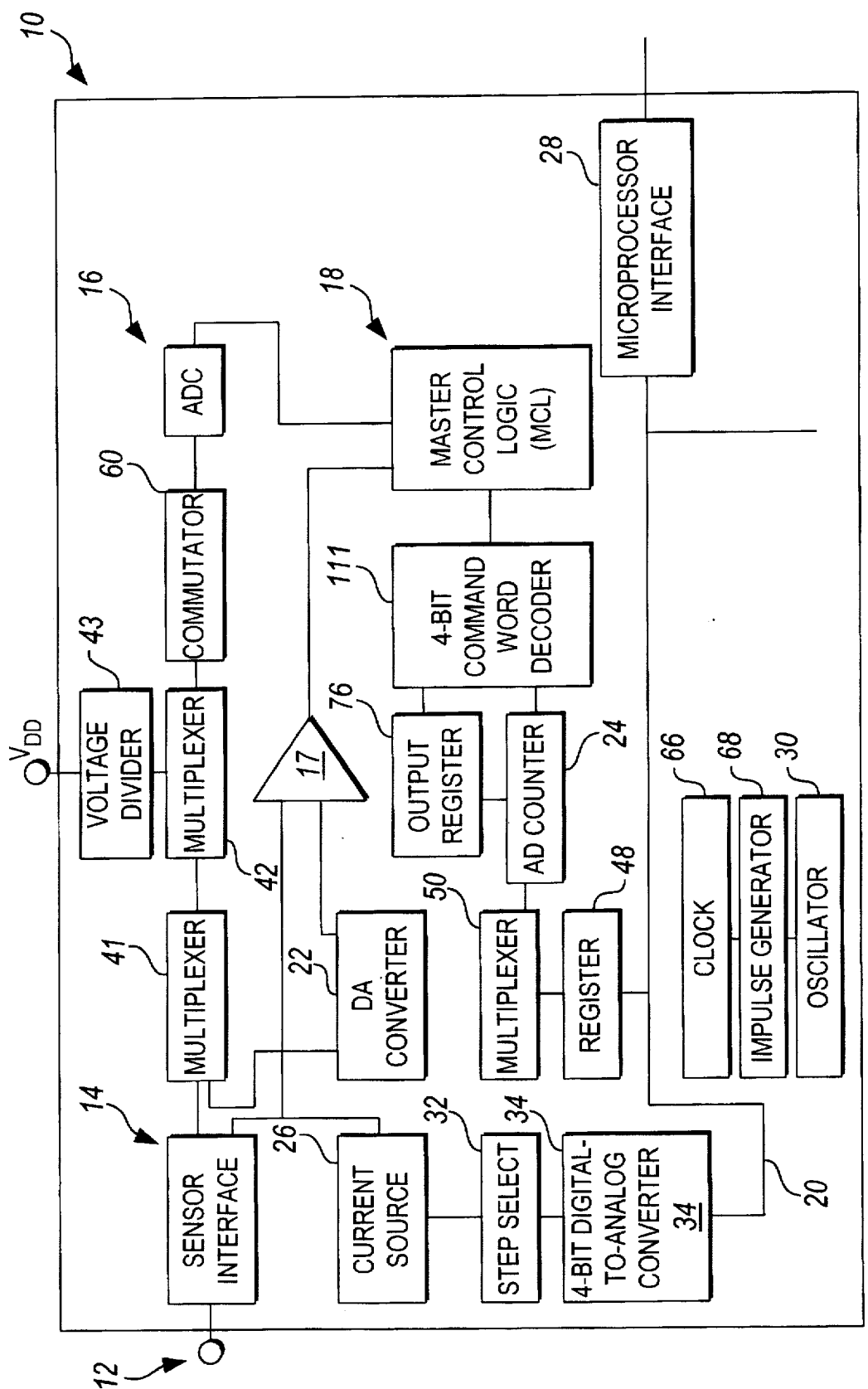
FIG. 1 is a schematic circuit diagram of a sensing circuit of the invention.

FIG. 1 illustrates a simplified schematic representation of the signal processing circuit in accordance with the invention. In particular, an altimeter application will be described having a temperature operating range of −10° C. to 55° C. and an altitude range of −400 m to 6000 m. Circuit 10 includes sensors 12 connected by means of a sensor interface 14 to an analog-to-digital converter (ADC) 16 and to a comparator 17. Master control logic (MCL) 18 controls the various phases of the ADC 16 and receives inputs from the ADC and the comparator 17. The MCL 18 has an output connected to an internal bus 20. The bus 20 connects the master control logic 18 to a digital-to-analog (DA) converter 22, an AD counter 24, and a current source 26 which is connected to the sensor interface 14. The signal processing circuit 10 further includes a microprocessor interface 28. The circuit 10 also includes an oscillator circuit 30 for controlling the system clock (not shown) which, in turn, controls the AD counter 24.

The sensors comprise a piezo-resistive sensor connected in a bridge circuit. It will be appreciated that the piezo-resistive sensor could be replaced by any resistive sensors with a DC voltage output which has to be converted to digital value. Power supplied to the sensor 12 is adjustable by virtue of a programmable current source 26. The current source 26 is manipulated by means of a step select as is described in greater detail below.

The ADC 16 is also discussed in greater detail below. It, essentially, consists of a dual slope sawtooth integrator. This allows a three-fold compensation to be accomplished, namely a level shift (off-set adjustment) in the neutral phase, a phase length adjustment during the positive slope phase, and reference voltage transformation during the adjoining negative slope phase.

The circuit 10, among other things, provides for current source adjustment by determining the amount of current required at a predetermined minimum temperature to obtain an output reading from the ADC 16. The step select 32, connected to the current source 26, gradually increases the amount of current supplied to the bridge circuits. The step select 32 is controlled by a 4-bit digital-to-analog converter 34 in 16 programmable discrete steps. The circuit 10 is controlled by an external microprocessor (not shown) which can include a RAM or EEPROM. Once an output is obtained from the ADC 16, the value of the step select is recorded and stored in the microprocessor RAM/EEPROM or in an external RAM or EEPROM as a 4-bit nibble. The value is obtained at the lowest temperature, T1 for example −10° C. or 0° C. It will be set to an approximate reading of 30 to 50 analog-digital conversion (ADC) counts, leading to an ADC resolution of 0.1° C. per bit in the case of a programmable 10-bit temperature signal conversion. This value accounts for sensor variations at the minimum temperature since higher temperatures will produce higher voltage readings and will be compensated for by means of the temperature compensation techniques described below.

Figure 2:
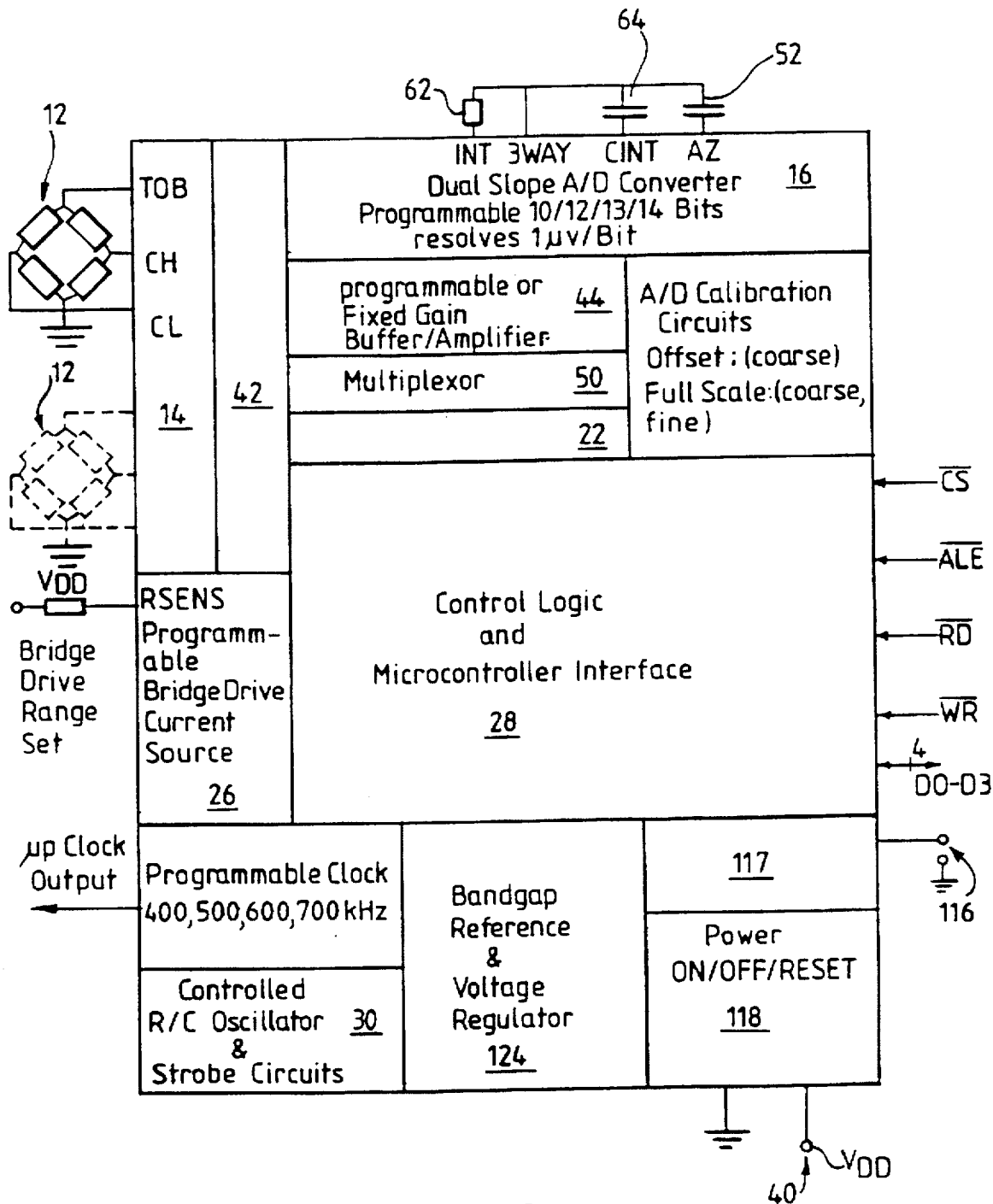
FIG. 2 is a schematic diagram of a sensing circuit chip in accordance with the invention.

Thus proper temperature readings are ensured for temperatures above the minimum temperature T1. The initial voltage correction is calculated only once and the corresponding value, in the RAM or EEPROM is subsequently used to apply the appropriate current to the top of the sensor bridge 12 (FIG. 2). By adjusting the current as described above, three objectives are attained: the temperature reading is set to a desired low value at a predetermined minimum temperature; current saving is achieved by running the bridge at a minimum current; the maximum signal is achieved which permits low sensitivity sensors to be used.

Figure 9:
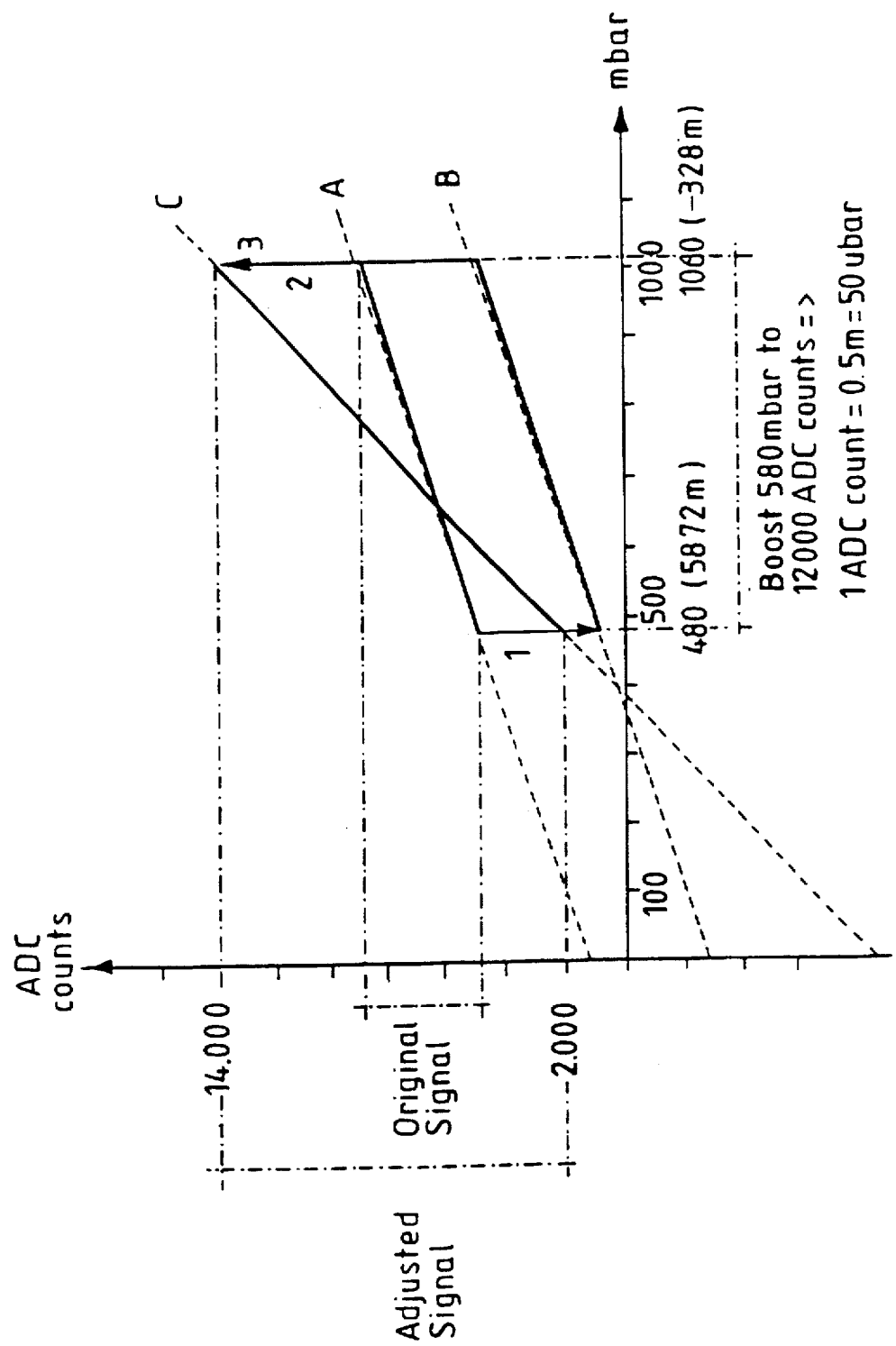
FIG. 9 is a profile showing the signal adjust process.

In order to achieve maximum converter resolution it is necessary to adjust the off-set and the full scale. This is illustrated in FIG. 9 for a 1-bar pressure sensor. FIG. 9 illustrates an ADC count versus pressure gradient in which A depicts the original non-adjusted signal, B depicts the off-set compensated signal, and C depicts the off-set and span adjusted signal. The 1-bar pressure sensor contemplated in FIG. 9 is driven with a current source of 450–600 μA to generate a bridge top voltage of 1.75V for the circuit 10 using a 3V supply. The off-set and full scale span signals at 1.75V bridge voltage are as follows:

Off-set: −9 mV to +9 mV

Full scale span: 63 mV to 98 mV

For a pressure sensor to be used in an altitude range of −400 to 6,000 meters the corresponding pressure range is 1060 to 480 mbar.

Therefore, only about 580 mbar or 58% of the 1 bar sensor full scale signal is used. It is therefore desirable to adjust the sensor window to fall within the 1060 to 480 mbar range. This requires that the off-set of −9 mV to 9 mV be taken into account. Similarly, 42% of 63 mV to 98 mV full scale span should be off-set, thus giving a total minimum off-set of −9+27 mV=18 mV and a maximum off-set of +9 mV+42 mV=51 mV.

The remaining full scale signal (user range) will be 38 mV to 58 mV. Spread over 12,000 DC counts (1 count=0.5 meters) will lead to 3.2 to 4.8 μV per ADC bit.

To set the ADC resolution to an approximate ADC reading of between 500 and 700 counts at 418 mbar (5872 meters), an off-set rough adjust is performed first. This is done at the lowest temperature T1 and stored as a single byte of data OS-RADJ. Thereafter the full-scale rough adjust is performed to achieve an ADC pressure value of 14,000+100 counts at 1,060 mbar (−400 meters). This value is stored as a single byte in EEPROM as FS-RADJ.

Figure 10A:
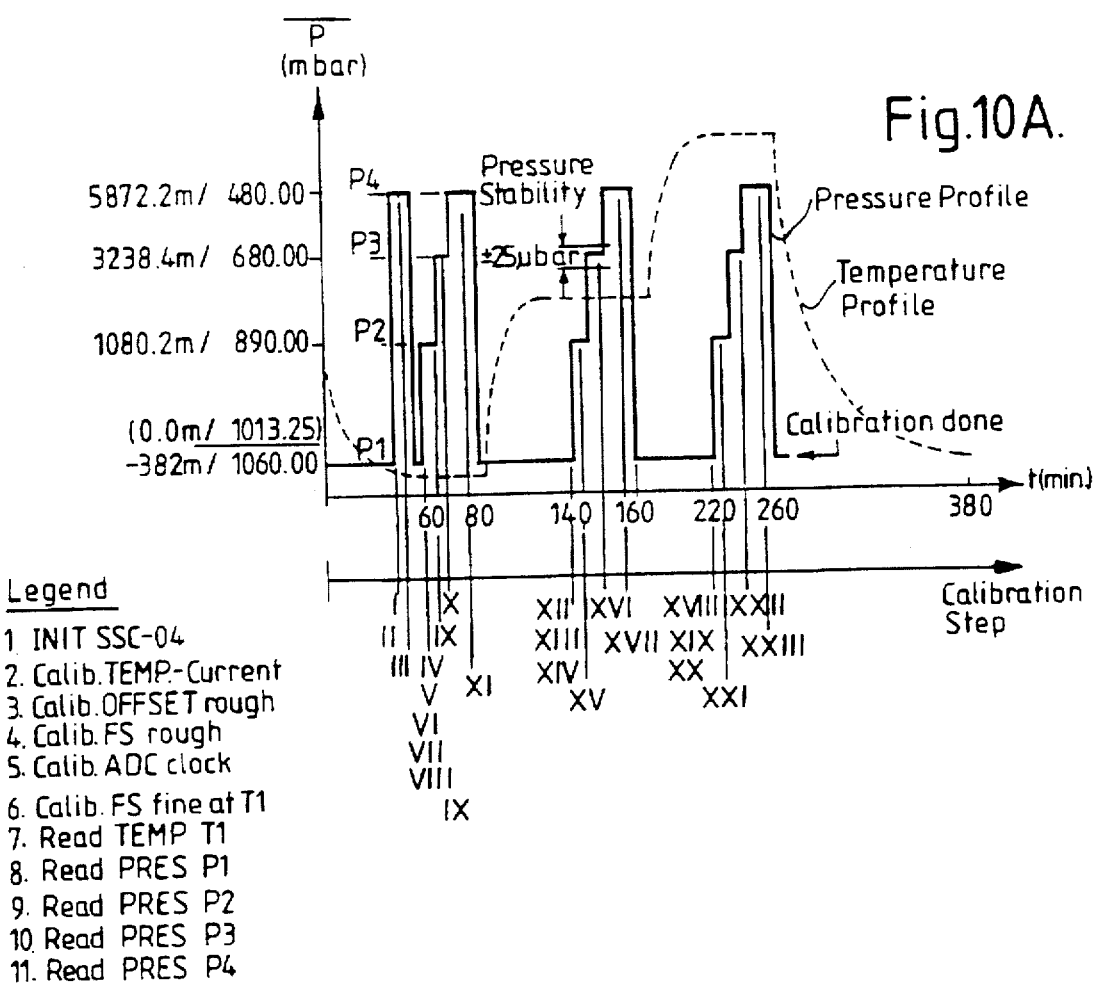
FIGS. 10A and 10B show a pair of profiles showing a pressure-time and a temperature-time relationship used in obtaining pressure compensation values at predetermined temperatures during a calibration phase.
Figure 10B:
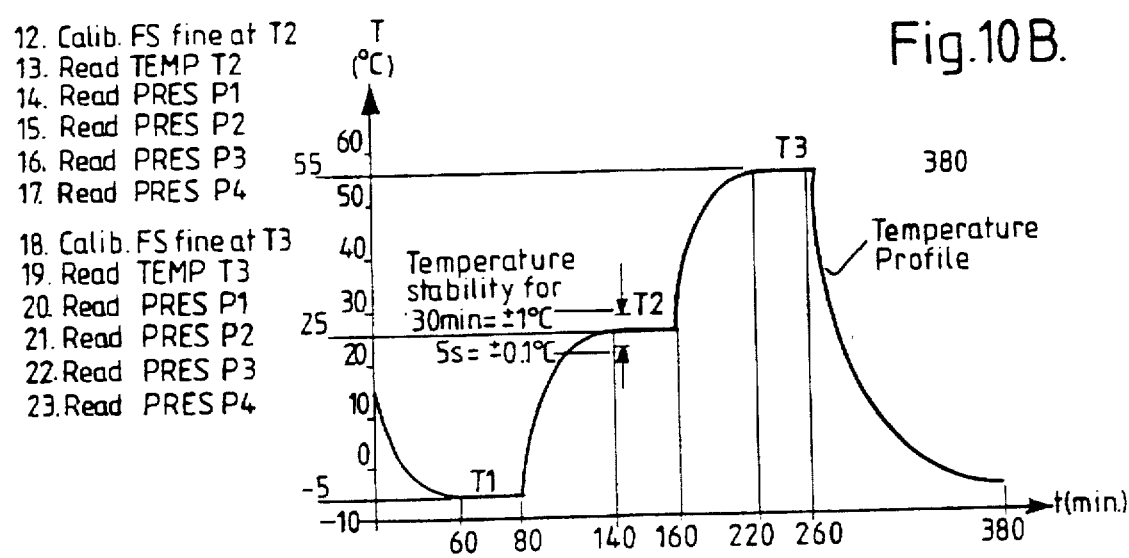

The rough adjusts, including sensor off-set and full scale will lead to an ADC resolution of approximately 50 μbar per bit or 0.5 meter per bit for a 14-bit pressure signal. Once the rough adjustments have been performed, the circuit 10 is further programmed according to the temperature/pressure-calibration profiles illustrated in FIG. 10. During the temperature/pressure-calibration profiles the sensor full scale span is further trimmed until the ADC reads exactly 14,000 ADC counts. This is done at each calibration temperature.

In order to obtain the compensation values corresponding to the temperature measurements, the circuit 10 undergoes a calibration phase during which the circuit 10 is exposed to pressure and temperature curves. At various temperatures the circuit 10 is exposed to a variety of pressures and the corresponding pressure compensation values recorded. Subsequently, during operation of the circuit, the temperature is determined during the temperature measurement phase, and the corresponding compensation value obtained for use during the pressure measuring phase. Typically, only a few temperature values and corresponding temperature compensation values are stored in the microprocessor RAM/EEPROM or external EEPROM. Any other temperatures experienced during the measurement phases are obtained using interpolation techniques performed by the microprocessor. The various steps in the calibration of the circuit will now be discussed with reference to the calibration profiles illustrated in FIG. 10.

During step I, the circuit is initialized to specify maximum and minimum values to avoid conversion overflow. These include:

the fastest frequency (750 kHz to achieve the shortest integrator ramp)
the minimum pressure current,
the minimum temperature current,
the minimum FS-RADJ
the maximum OS-RADJ
the middle FS-FADJ (±12.5% of full-scale fine adjust signal).

During step II temperature current is calibrated as discussed above. The programmable current source register is increased in increments of 1 from 0 to F until more than 40 ADC counts can be read.

During step III, off-set rough adjust is performed as discussed above.

During step IV, full-scale rough adjust is performed as discussed above to achieve an ADC pressure value of 14,000+100 ADC counts at 1060 mbar.

During step V the ADC clock is calibrated to achieve a minimum integrator ramp height of 1.8V at full scale signal conversion (1060 mbar). This is achieved by running the ramp conversion at the highest frequency of 750 kHz and monitoring a conversion complete (CC) flag. If the CC flag reads 1, conversion is complete and a ramp height of 1.8V is achieved. If the CC flag does not go 1, the frequency is reduced until a conversion complete is obtained. The frequency at which this occurs is stored in the EEPROM as ADC-CLOCK.

In step VI, full-scale fine adjust occurs. The full-scale fine adjust register is trimmed until the ADC pressure value reads exactly 14,000 ADC counts at 1060 mbar. This is stored in the EEPROM as FS-FADJ (T1) for temperature T1. Full-scale fine adjust allows only a 25% variation in the span of the positive slope ramp, as indicated by reference numeral 35 in FIG. 11. Full scale fine adjust changes the 14 bit counter value by presetting its lower 12 bits which is equivalent to 25% of span variation. For greater adjustment range, all 14 bits could be adjusted.

Figure 11:
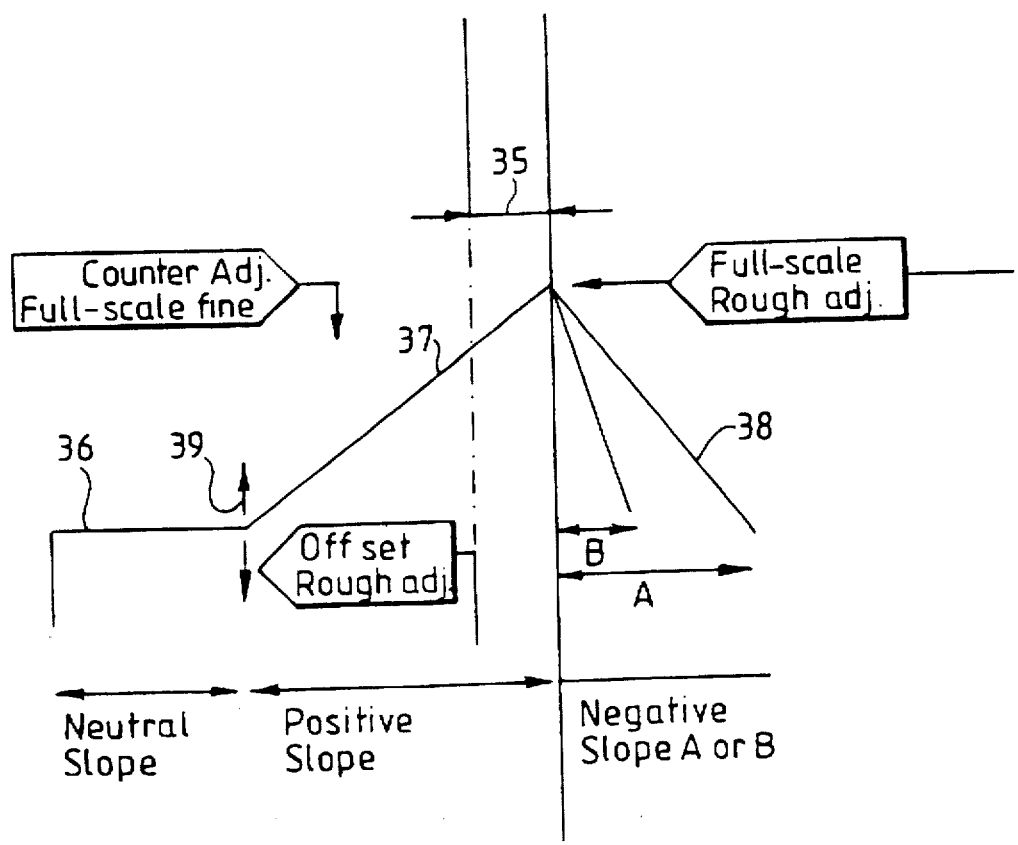
FIG. 11 is an dual slope integration profile showing compensation inputs in accordance with the invention.

FIG. 11 illustrates the neutral phase 36, the positive slope phase 37 and the negative slope phase 38 of the integrator. During off-set rough adjust the starting point of integration is vertically adjusted as indicated by reference numeral 39. During full-scale rough adjust, the reference voltage to the integrator is adjusted to change the slope of the negative ramp 38. As illustrated in FIG. 11, the off-set is adjusted by means of off-set values having an 8-bit length. Full-scale rough adjust is achieved by means of the full-scale rough adjust value having an 8-bit length, and full-scale fine adjust is achieved by presetting 12 bits of the 14-bit counter. Thus 4096 counts, corresponding to 25% of the maximum possible 16384 counts, can be preset to achieve full-scale fine adjust. In other embodiments, 13 or 14 bits could be preset to increase the full-scale fine adjustment range.

In step VII, a temperature conversion is performed with the preadjusted temperature current. The calibration temperature is saved as CAL-TEMP (T1).

In step VIII, a pressure conversion is performed with a preadjusted pressure current or the fixed maximum current depending on the sensor used. The calibration pressure is saved as CAL-PRES (T1, P1) in the EEPROM.

In step IX a second pressure conversion is performed with the pressure current, at pressure P2 and the resultant calibration pressure saved as CAL-PRES (T1, P2).

In step X, a third pressure conversion is performed with the pressure current, at pressure P3 and saved as CAL-PRES (T1, P3).

In step XI, a pressure conversion is performed at pressure P4, again at the pressure current, and saved as CAL-PRES (T1, P4).

For steps XII to XVII the procedure is similar to that set out above for steps VI to XI, except that the readings are preformed at temperature T2.

For steps XVIII to XXIII the procedure is once again similar to that described for steps VI to XI, except that the readings are taken at temperature T3.

In order to obtain the sign of the pressure sensor temperature coefficient sensitivity so as to trim the 14-bit ADC during full-scale fine adjust, the non-compensated pressure sensor input signal at P1 =1.062 mbar (−400 meters) is measured. This is performed during the cool down phase from room temperature to temperature T1 (for example, −10° C. or 0° C.). The value is stored as a 1-bit data flag with the name TC-SIGN.

It will be noted that the full-scale fine adjust is executed after reading the calibration temperature equivalents. The full-scale fine adjust settings FS-FADJ (T1), FS-FADJ (T2), and FS-FADJ (T3) are stored as a double byte data array to make a total of 6 bytes.

The calibration temperatures CAL-TEMP (T1), CAL-TEMP (T2), and CAL-TEMP (T3) are stored as a single data byte array to make a total of 3 bytes.

The calibration pressure equivalents CAL-PRES take place at the calibration pressures P1, P2, P3, and P4, each being performed at temperatures T1, T2, and T3. The values are stored in a double byte data array having a length of 2×4×3=24 bytes.

The calibration nominals for temperature and pressure stored during the initialization step I can be stored on floppy disk. The test PC which is loaded with the floppy disk will write the calibration nominals, via a serial port, directly into the microprocessor RAM/EEPROM or external EEPROM. After the calibration of 1,000 units is successfully performed the calibration nominals are dumped to the RAM/EEPROM. In another embodiment, nominal recording, and dumping into EEPROM after calibration, is avoided, and data shuffling from RAM into EEPROM is reduced by pre-defining the calibration nominals for pressure and temperature and storing them in ROM as constants. In such an embodiment a fixed ROM-based calibration is used wherein the calibration nominals are stored on ROM (mask-microprocessor program). The ROM constants are defined in terms of internal pressure units (IPU), in which 1 IPU=1 ADC count, corresponding to an altitude change of 0.5 m, and in terms of internal temperature units (ITU) in which 1 ITU=1 ADC count, corresponding to a 0.1° C. temperature change. The ROM constants for an altimeter with 1 m display resolution, an operation range of −400 m to 6000 m and temperature compensation for −5° C. to 55° C., are defined as follows:

T1=−5° C.=−50 ITU
T2=25° C.=250 ITU
T3=55° C.=550 ITU
P1=1060 mbar=21200 IPU (corresponds to −382 meters)
P2=890 mbar=17800 IPU (corresponds to 1080.2 meters)
P3=680 mbar=13600 IPU (corresponds to 3238.4 meters)
P4=418 mbar=3600 IPU (corresponds to 5872.3 meters)

As mentioned above, the calibration signal range is P1−P4=1,060−480=518 mbar. For safety reasons a 7% margin has been added to achieve 625 mbar pressure signal range for 12,500 ADC counts (=12,500 IPU).

Since the pressure range has been limited to between 480 and 1060 mbar (−400 m to +6000 m), a virtual (mathematical) add-on of the canceled off-set has to be performed to obtain the absolute pressure. The virtual off-set VIR-OFS is the difference between the calibration nominal pressure, which is defined as a constant 21200 IPU and the ADC read-out at P1, which is programmed to be about 14,200±20 ADC counts:

VIR-OFS=21200−(14200±20) approximately=7000 IPU.

This is performed automatically during the interpolation process. The only off-set that has to be added thereafter is the user off-set to adjust the display read out to any user defined or adjusted pressure or altitude value.

During normal sensing operation of the circuit 10 the circuit 10 operates in either a temperature measurement, pressure measurement, or voltage supply measurement mode. The temperature measurement cycle in this embodiment is a 20 second cycle in active mode using a 10-bit accuracy. The pressure measurement cycle in this embodiment occurs every second during active mode, with an accuracy of 14-bits.

During sleep mode both the temperature and pressure measurement cycles are performed every two minutes in this embodiment, the pressure measurement cycle being performed with an accuracy of 10 to 14-bits depending on the Power Source mode and wake up threshold for altitude change detection.

In addition there is a 10-bit power supply voltage measurement cycle which is performed when needed. It was found that a 200 mV power supply variation will cause an ADC read out variation, in the FIG. 3 embodiment, of one ADC count (1 bit). This can easily be compensated for by means of a straightforward linear interpolation.

Since the actual temperature is needed to calculate the full-scale fine adjust value, the temperature measurement must always be performed prior to the first pressure measurement. To start an A-D conversion a start command is sent to the circuit 10. This starts the A-D conversion for the selected type of conversion: temperature conversion, pressure conversion, or power supply voltage conversion. An appropriate 4-bit binary number is written into a conversion register of the circuit 10. The temperature conversion is fixed to an 10-bit conversion, and the power supply voltage conversion is fixed to a 10-bit conversion. In contrast, the pressure conversion has 4 programmable ADC resolutions. These are programmed into an ADC resolution select register by means of 4-bit words to select either 10-bit, 12-bit, 13-bit, or 14-bit conversion. The converted value is available from an ADC read-out latch. An ADC status register latch includes a conversion overflow flag (COV) and a conversion complete flag (CC). If CC=1 and COV=0 the appropriate ADC values of pressure and temperature or power supply voltage can be read from the read out latches.

The ADC readouts of temperature and pressure are non-nominal ADC numbers and must be converted into ITUs (internal temperature units) and IPUs (internal pressure units). This is done by means of polynomial interpolation. The resultant nominal pressure and temperature values, which are stored as 2-byte variables are used to calculate a displayed pressure in mbars or mm of Mercury, and in degrees C or degrees F, respectively. Alternatively the pressure can be represented in terms of altitude in units of meters or feet.

As mentioned above, during normal sensing operation, specific full-scale fine adjust values are obtained from the pre-programmed values by polynomial interpolation. Two forms of interpolation may be invoked: La Grange interpolation or Newton interpolation. The La Grange interpolation has the advantage of working without coefficients. Thus the interpolation of the function y=f(x) can be calculated directly from interpolated x, y points (X0, Y0; X1, Y1; X2, Y2; X3, Y3; ... Xn, Yn). On the other hand it involves many terms, and multiplication and division operations.

Newton interpolation, on the other hand, requires constant coefficients. These are calculated from the tabulated x, y points and stored as coefficients C0, C1, C2, C3, ... Cn, for later use in the interpolation formula.

The Newton interpolation formula takes the form:

y=f(x)

for tabulated x,y points (X0, Y0/X1, Y1/X2, Y2/X3, Y3) is:

$$Y=C0+C1*(X-X0)+C2*(X-X0)*(X-X1)+C3*(X-X0)*(-X1)*(X-X2)$$

Coefficients C are:

$$C0=Y0, \; C1=\frac{Y1-Y0}{X1-X0}, \; C2=\frac{\frac{Y2-Y0}{X2-X0}-C1}{X2-X1}$$

$$C3=\frac{\frac{\frac{Y3-Y0}{X3-X0}-C1}{X3-X1}-C2}{X3-X2}$$

In order to calculate the temperature compensated data array CAL-PRES the coefficients for four polynomial interpolations must be precalculated. These are stored in a double byte data array and have a length of 16 bytes. The same polynomial interpolation is used for CAL-TEMP and FS-FADJ. The coefficients for the full-scale fine adjust settings are stored in a double byte data array having a length of 4 bytes. The coefficients used for the polynomial interpolation in between CAL-TEMP and the calibration nominals for the temperature CAL-NOM-T, which are used to calculate the temperature in internal temperature units are calculated and stored in a double byte data array having a length of 4-bytes.

The only coefficients that have to be recalculated each time the temperature changes, are the ones needed to calculate PRES-ITU. The input to this third grade polynomial interpolation is the actual measured ADC pressure PRES-ADC, the actual temperature compensated calibration pressure CAL-PRES-T, and the calibration nominals for pressure CAL-NOM-P. Since CAL-PRES-T is dependent upon temperature, any temperature change requires a recalculation of the three double byte coefficients. All other interpolations, comprising a total of six second grade polynomial interpolations, use constant coefficients.

In an embodiment in which Newton interpolation is used, the coefficients are calculated by the microprocessor after the calibration stage, whereafter the values are dumped into the EEPROM. This requires EEPROM/microprocessor data shift which can be avoided by using the La Grange interpolation, which is a polynomial interpolation between four points. The La Grange interpolation formula is indicated as follows:

y=f(x)

for tabulated x,y points (X0,Y0/X1,Y1/X2,Y2/X3,Y3) is:

$$Y=L0*Y0+L1*Y1+L2*Y2+L3*Y3$$

wherein L0, L1, L2 and L3 are:

$$L0 = \frac{(X-X1)*(X-X2)*(X-X3)}{(X0-X1)*(X0-X2)*(X0-X3)}$$

$$L1 = \frac{(X-X0)*(X-X2)*(X-X3)}{(X1-X0)*(X1-X2)*(X1-X3)}$$

$$L2 = \frac{(X-X0)*(X-X1)*(X-X3)}{(X2-X0)*X2-X1)*X2-X3)}$$

In order to calculate the altitude, it is calculated as a function of the actual pressure value PRES-IPU. This can be done using any well known altitude formula. In order to save ROM space and increase speed, the altitude can, instead, be approximated by using linear interpolation or polynomial interpolation. In the latter approach, an altitude formula is used to obtain precalculated values that are stored and then used in obtaining intermediate values by means of interpolation. In one example, the altitude/pressure data table typically contains 48 double byte values. Thus the input would be PRESS-IPU, and the output would be the actual altitude in meters *2 =internal altitude units (IAU).

For greater accuracy, the method of approximating the International Barometric Altitude Formula would be to use a polynomial interpolation as used to calculate the ambient pressure PRESS-IPU. Clearly, a polynomial interpolation will provide greater accuracy only if a high grade polynomial is used. This, however, has the disadvantage of increasing ROM space and reducing speed.

Figure 3:
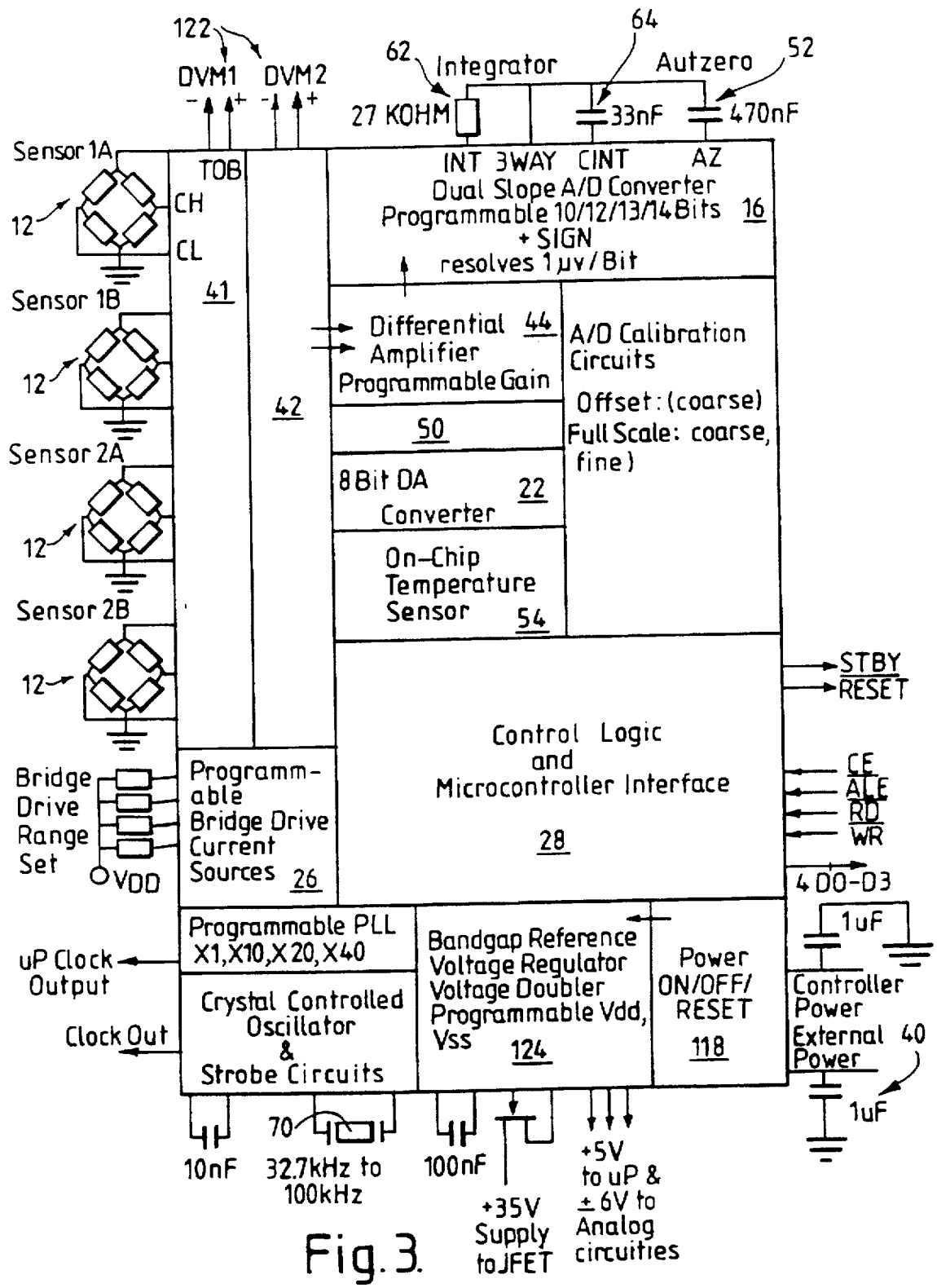
FIG. 3 is schematic diagram of another embodiment of a sensing circuit chip in accordance with the invention.
Figure 4:
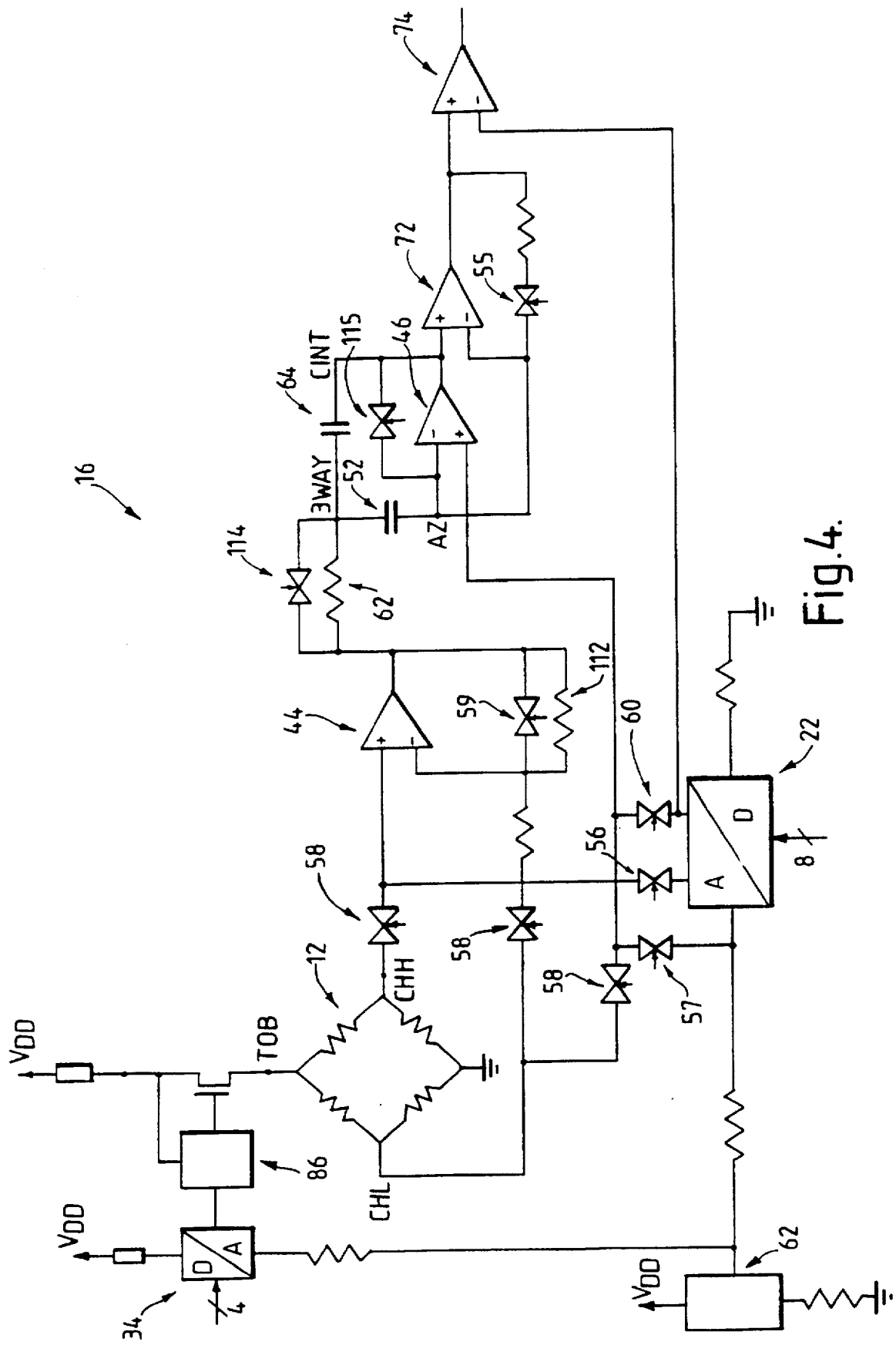
FIG. 4 is a detailed schematic circuit diagram of part of the sensing circuit chip of FIG. 2 showing the circuit in a pressure sensing mode.
Figure 5:
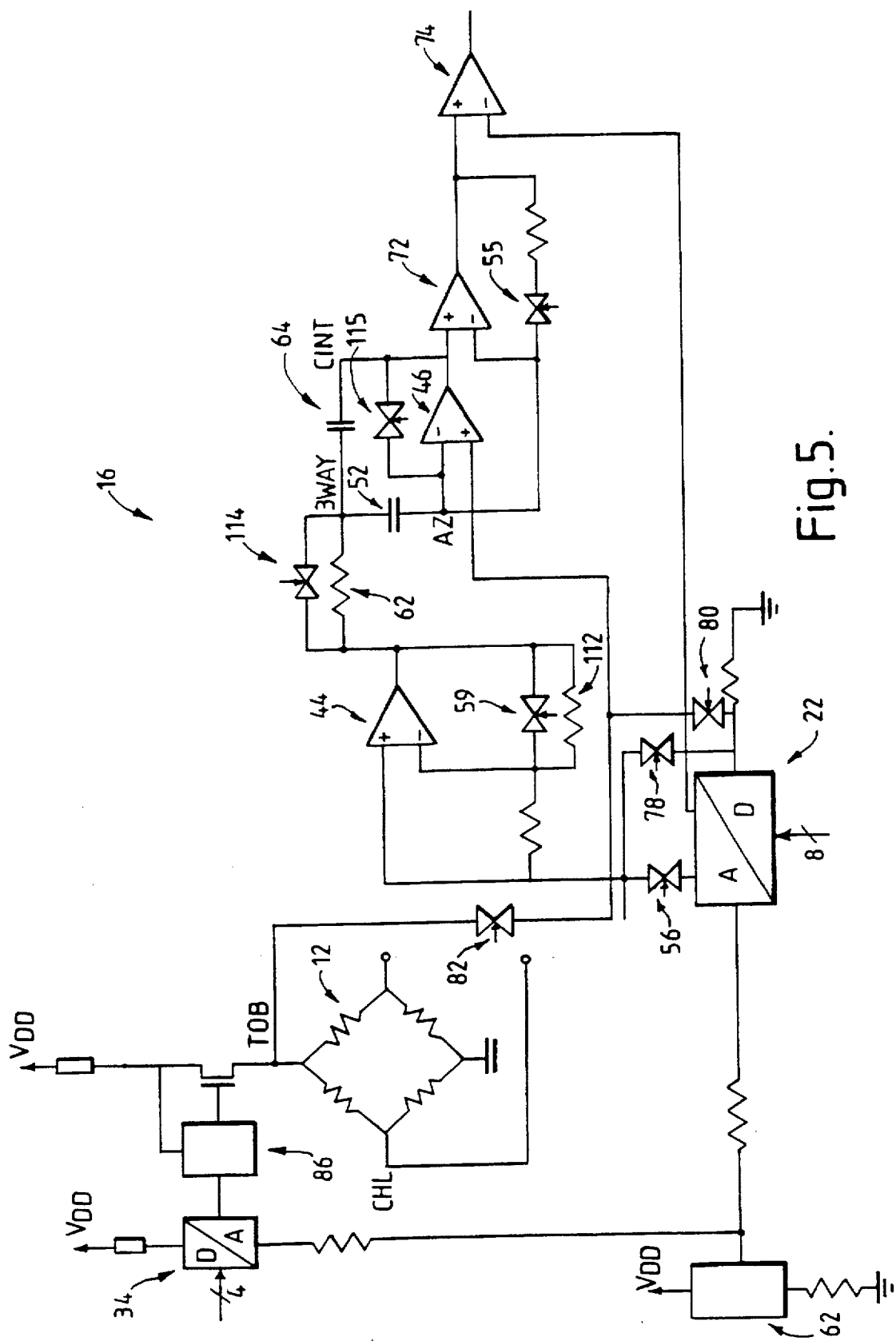
FIG. 5 is a detailed schematic circuit diagram of part of the sensing circuit of FIG. 2 showing the circuit in a temperature sensing mode.

The circuit will now be discussed in greater detail with reference to the schematic representations of two embodiments of the sensor circuit chip (FIGS. 2, and 3). FIG. 2 is a schematic representation of a pressure sensing circuit chip in accordance with the invention. FIG. 3 is a schematic diagram of another embodiment of a pressure sensing circuit chip in accordance with the invention. FIGS. 2 and 3 show the sensors 12 as comprising a pair of piezo-resistive sensor strings connected in a bridge circuit to a pressure sensing circuit. The main power supply $V_{DD}$ is connected to the input 40. As mentioned above, the sensor bridge voltage feed can be preselected and is adjusted once. The temperature equivalent voltage on the bridge sensor is determined and compensated for by means of the current source 26. As described with respect to FIG. 1, the 4-bit digital-to-analog converter 34 instructs the step select 32 in sixteen programmable discrete steps. This causes current of the appropriate magnitude to be applied to the respective sensor bridges 12 via the interface 14, which takes the form of a multiplexer. By adjusting the current to the bridges the sensor signal is appropriately adjusted for the desired output voltage range. Instead the voltage at the top of the bridge can be adjusted by means of a voltage source. The sensors 12 of the bridge circuits (FIG. 1) are connected via the multiplexer 14 (FIG. 2 embodiment) or multiplexer 41 (FIG. 3 embodiment) to a second multiplexer 42 (FIGS. 2 and 3). The multiplexers 14, 41 serve to switch the appropriate input signal, for example, pressure or temperature, or supply voltage to the ADC 16. During voltage supply sensing mode, a voltage divider 43 switches the supply voltage into the ADC 16. The multiplexer 42, in turn, connects the appropriate signals: off-set compensation voltage (derived from the off-set rough adjust value), sensor signal, or full-scale rough adjust voltage to the ADC 16. The ADC 16 is preceded by a buffer/amplifier 44, which is discussed in greater detail below. The circuit will also be discussed in greater detail with respect to FIGS. 4 to 6 which are circuit diagrams illustrating the ADC 16 in each of three modes: pressure sensing mode, temperature sensing mode, and power supply sensing mode. The ADC 16 includes an integrator 46, connected to the bridge circuits 12 (FIGS. 4 and 5). As is shown in FIGS. 2 and 3, the multiplexers 38 and 40, and the buffer/amplifier 44 are located between the bridge circuits 12 and the integrator 46.

The full-scale rough adjust voltage constitutes the reference voltage and dictates the slope of the negative slope portion of the integration process. It emanates from the full-scale rough adjust value in the microprocessor EEPROM or RAM or external EEPROM (not shown) and is routed to the negative input via the interface 28, the bus 20, registers 48, a multiplexer 50, the DA converter 22, the multiplexer 41, the multiplexer 42, and the buffer/amplifier 44 as illustrated in FIG. 1. The multiplexer 50 passes either the off-set compensation value or the full-scale rough adjust value to the digital-to-analog converter 22 for supply to an off-set storage capacitor 52 (FIG. 4) or the ADC, respectively. The voltage off-set storage capacitor 52 is connected between the buffer/amplifier 44 and the negative input of the integrator 46. As mentioned above, during normal sensing operation the microprocessor determines whether a temperature measurement pressure measurement, or voltage supply measurement is to be performed. Pressure measurements obtained from the sensors 12 are adjusted in the ADC 16 by taking into account the corresponding ambient temperature and/or chip temperature of the measurement circuit. Ambient temperature can be measured by using a separate temperature sensing circuit, for quick temperature display. Typically, however, greater accuracy is required for temperature error compensation. This is done by measuring the temperature at the top 53 (TOB) of the bridge and making use of the ADC 16. In embodiments where no separate ambient temperature sensor is included, the temperature at the top 53 of the bridge is measured using the ADC 16 as is described in greater detail below with respect to FIG. 5. A temperature sensing period is invoked at predetermined intervals or when desired by the user. As mentioned above, the temperature of the chip can also be monitored. This is done using a separate chip temperature sensor 54 (FIG. 3) in the event that the sensors 12 and the processing circuitry are spaced physically sufficiently far apart that temperature differences between the sensors and the circuitry become a significant factor. Changes in chip and ambient temperature affect pressure measurements and are included in the pressure measuring process as described in greater detail below. The various modes of operation: pressure sensing, temperature sensing and voltage supply sensing will be discussed in greater detail below. FIG. 1 illustrates a separate temperature sensing circuit. When quick, less accurate, 8-bit temperature sensing is done, for example with the on chip temperature sensor or the external ambient temperature sensor (not shown) or by sensing voltage changes at the top of the sensor bridge, it is monitored by feeding the signal to the comparator 17 (FIG. 1). The other input of the comparator 17 is connected to the AD counter 24. The counter 24 steps up the voltage incrementaly until the voltage exceeds the bridge voltage, whereupon the output of the comparator 17 stops the counter 24. The resulting 8-bit counter value is used to obtain a corresponding pre-stored voltage compensation value from the microprocessor RAM/EEPROM or external EEPROM for adjusting the pressure signal from the sensors 12 for temperature errors during pressure sensing. It is clear that this can only be done when the 8-bit temperature resolution (255 counts) is sufficient to correct for the temperature related pressure sensor error. However, it should be noted that for an altimeter with a 1 m resolution, at least 10-bits (1024 ADC counts) must be used to achieve the necessary temperature error compensation since a change of 0.2° C. can change the altimeter (pressure) readout by as much as 2–4 m.

The basic operation of the dual slope integrator will be described with reference to FIG. 11 and the circuit in FIG. 4. The voltage on the capacitor 52 adjusts the starting point of the integrator by raising or lowering the starting point. Thus, in the neutral phase any deviations of the internal circuitry, such as voltage displacements and long-term instabilities are corrected by adjusting the starting point of the integrator to a previously-measured and programmed voltage level, thereby eliminating the sensor bridge deviation voltage due to off-sets in the sensor bridge. This off-set compensation value is derived as described above and stored on the microprocessor EEPROM or RAM, or external EEPROM for later use. During pressure sensing, the off-set compensation values are obtained from the microprocessor EEPROM or RAM, or external EEPROM and are fed to the 8-bit DA converter 22. The resulting analog signal is placed on the capacitor 52, which is connected to the negative input of the integrator 46. This establishes a virtual null point voltage at the negative input of the integrator 46 and is thus also referred to as auto-zeroing. In order to charge the capacitor 52, commutators 55, 56, 57 are closed while the remaining commutators illustrated in FIG. 4 are opened.

During the positive phase of the integration process when a pressure measurement is performed, the commutators 56, 58, 59, 60, 61 and 62 are closed and the remaining commutators in FIG. 4, opened. The signal from the sensor 12 is thus fed to the integrator 46 (FIG. 4). This is a negative voltage, the magnitude of which is automatically adjusted by the charge on the capacitor 52. The negative voltage on the negative input of the integrator 46 causes current to flow through the resistor 63 away from the integrator 46. The output voltage of the integrator 46 therefore increases at a rate proportional to the input voltage. The output voltage thus ramps up for a fixed interval as the capacitor 64 of the integrator charges up. Referring also to FIG. 1, the charging interval is of a fixed duration and is determined by the counter 24, the clocking cycles of which are determined by the clock 66, which is connected to the oscillator 30. The counter 24 is a programmable 14-bit counter. Thus the counter can count up to a maximum of $2^{14}$ pulses from the clock 66. Thus, during the positive slope phase, the programmable counter is used to preset 12 to 14 bits of the full-scale fine adjust range. The clock 66, which is connected to the oscillator 30 via an impulse generator 68, applies the appropriate clock signal to the counter 24. A counter in the master control logic counts the number of clock pulses and terminates the positive slope phase after a fixed, predetermined period. At the end of this phase, the counter is reset to 0. The clock signal is generated by an on chip R/C oscillator with programmable frequencies of 500, 600, 700, and 800 kHz. This is illustrated in FIG. 2, and indicated generally by reference numeral 30. In another embodiment, illustrated in FIG. 3, a crystal 70 is utilized for high speed application to achieve up to 4 MHz with an on chip programmable PLL-circuit.

Figure 6:
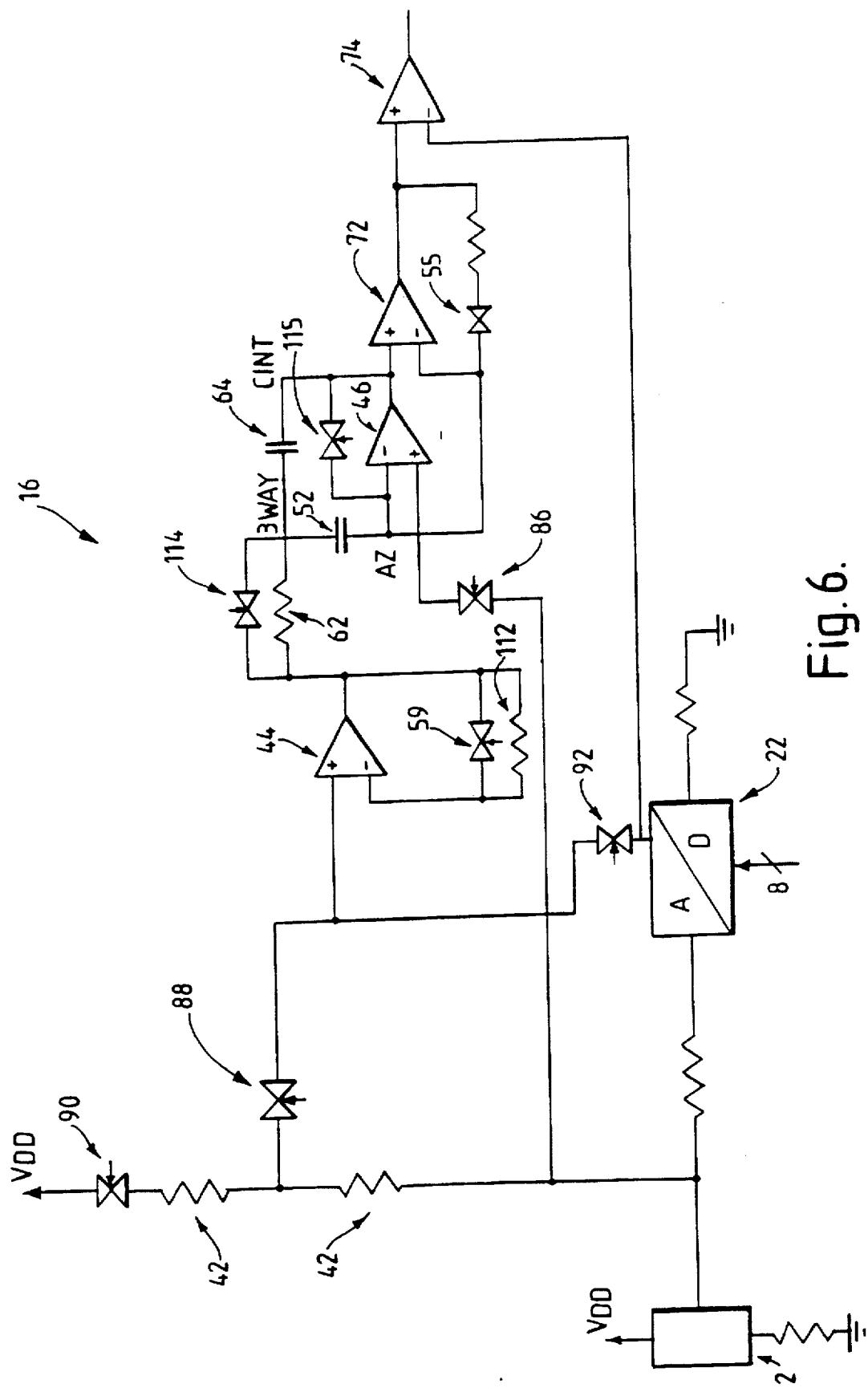
FIG. 6 is a detailed schematic circuit diagram of part of the sensing circuit of FIG. 2 showing the circuit in a voltage sensing mode.

During the negative slope phase, commutators 56, 60 are closed and the remaining commutators in FIG. 4, opened. It should be noted that the commutators (or switches) are represented in FIGS. 4, 5 and 6 as separate switches. Some of these, however, form part of the multiplexors 41, 42 in FIG. 1. The negative input of the integrator 46 is thus connected to a reference voltage for the negative slope phase of integration. This is supplied by the 8-bit digital-to-analog convertor (DAC) 22. Power to the DAC 22 is, in turn, supplied by a voltage reference 71. At this point the current into the integrator reverses direction and is proportional to the reference voltage. Thus the output voltage of the integrator 46 decreases linearly with a slope proportional to the reference voltage. The counter 24 is simultaneously enabled and counts the pulses from the fixed-frequency clock 66. When the output voltage of the integrator 46 reaches the initial starting voltage on the capacitor 52, the comparator 72 signals the master control logic 18 to stop the counter 24 and a conversion complete signal is generated by a second comparator 74. The final counter value is transferred to output registers 76 (FIG. 1). If the counter 24 should reach 100% of the preprogrammed full-scale value before the integrator reaches the virtual null voltage, a conversion overflow signal is generated and integration is stopped. The conversion overflow signal and conversion complete signal can both be called up as flags from a status output register in the MCL 18. It can be shown that the content of the counter 24, at the end of the conversion process, is proportional to $V_{in}/V_{ref}$ Wherein $V_{in}$ equals the input voltage from the sensor bridge being measured, and $V_{ref}$ is the reference voltage fed to the integrator during the negative slope phase.

Thus, the counter value gives a digital representation of the sensor voltage, wherein the reference voltage can be adjusted to take account of sensor sensitivity and signal variations (full-scale rough adjust). The reference voltage values are obtained from the microprocessor EEPROM or RAM, or external EEPROM, and correspond to temperature compensation values derived from preprogrammed values stored in the EEPROM 88 during the calibration phase. The microprocessor insures that appropriate values are read from the EEPROM or RAM and converted into analog form in the DA converter 22. This is illustrated in FIG. 1. The master control logic 18 passes the appropriate data to the DA converter 22 for setting up the ADC 16. The digital value are stored in the registers 48 prior to being sent to the DA convertor 22. The registers 48 are connected to the DA converter 22 by means of the multiplexer 50.

A Programmable-Dual-Slope ADC (PDSADC) and the Master Control Logic (MCL) 18 automatically undertake the signal compensation during the analog-digital conversion. As discussed above, only a few select values are pre-stored, whereafter the specific compensation values are calculated by polynomial interpolating between the calibration points. Thus, compensation takes place in the ADC 16. As mentioned above, temperature can be measured by the ADC circuit in a manner similar to that described for pressure measurements. Temperature is updated at predetermined intervals, or an external control switch or panel can be provided to engage a temperature sensing mode, pressure sensing mode or power supply sensing mode, when desired. The detailed circuit illustrating the temperature sensing mode is illustrated in FIG. 5. During the neutral or auto zero phase, commutators 55, 59, 78, and 80 are closed, while the remaining commutators illustrated in FIG. 5 are opened. During the positive slope phase or ramp-up the commutators 59, 78, and 82 are closed, while the remaining commutators illustrated in FIG. 5 are opened. During the negative slope phase or ramp-down, commutators 59, 80, and 56 are closed, while the remaining commutators illustrated in FIG. 5 are opened. FIG. 5 illustrates that the positive input of the integrator 46 is connected to the top 53 of the bridge. The bridge is supplied by the current or voltage source 86 which is, in turn, controlled by the DAC 34.

The circuit during the voltage supply sensing mode is illustrated in FIG. 6. As with pressure and temperature sensing, voltage sensing involves an integration process having a neutral or auto zero phase, a positive slope phase, and a negative slope phase. During the neutral or auto zero phase, commutators 55, 86 and 88 are closed while the remaining commutators illustrated in FIG. 6 are opened. During the positive slope phase, commutators 86, 88 and 90 are closed while the remaining commutators illustrated in FIG. 6 are opened. During the negative slope phase commutators 86 and 92 are closed while the remaining commutators illustrated in FIG. 6 are opened. FIG. 6 also illustrates the voltage divider 42 connected to the power supply.

As mentioned above, one of the features of the invention is to improve accuracy. It is therefore desirable to reduce noise to a minimum. The use of a single low noise amplifier/buffer 44 allows the overall noise to be reduced to approximately 2 to 3 µV per bit when using CMOS devices. Further noise reduction can be achieved by using a lateral NPN buffer, having a low noise bipolar-like front end implemented, as illustrated in FIGS. 7 and 8, on the same IC as a CMOS device. The overall noise can thereby be reduced to as low as approximately 1 µV ADC bit. FIG. 8 is a schematic representation of the low noise amplifier/buffer 44 that includes a lateral NPN bipolar transistor stage as part of the circuit of the invention. The lateral NPN bipolar transistor stage includes a pair of bipolar-like transistors 94, 95. Each of these transistors 94, 95 includes two collectors 96, 97, the collectors 96 being connected to $V_{DD}$ and the collectors 97 being connected to transistors 98, 99. Each of the transistors 94, 95 includes an emitter 100, the emitters 100 being connected to a transistor 101. The transistor 94 further includes a base 102, and the transistor 95 includes a base 103. The structure of the lateral NPN amplifier/buffer is illustrated in FIG. 7 and clearly shows both the N and the P doping, permitting both normal vertical flow as well as lateral current flow as indicated by the arrows 104, 105, respectively. As shown in FIG. 7, the current flow in the vertical direction constitutes approximately 80% of the total current flow. The lateral NPN bipolar transistor is based on a CMOS and NMOS transistor with two poly-gates 106 and three N+ diffusions 108 in a single P-Well 110. The use of such a lateral NPN bipolar transistor results in significant noise reduction.

As mentioned above, power supply compensation is also provided. This is performed automatically by the circuit 10 with an integrated band gap reference that is very stable, and the circuit is designed that $V_{DD}$ changes are canceled out of the AD conversion. For larger fluctuations the $V_{DD}$ input is fed into the multiplexer 41 during a calibration phase. The binary equivalent of the power supply voltage is produced to establish compensation values for various voltage fluctuations. Specific voltage fluctuations can be calculated by linear interpolation since a 200 mV voltage drop will cause the ADC value to drop by 1 bit.

Since the construction of the circuit 10 is based on a programmable system, which avoids the use of unnecessary hard wiring, it will be appreciated that the circuit is highly adaptable to different environments. In a preferred form of the circuit 10, the circuit is integrated on a CMOS microchip. It can be connected to an external computer by means of the microprocessor interface 28, as described above. Instead, a microprocessor, RAM, ROM, EEPROM, and data I/O's could be integrated on the same chip as the circuit 10.

The connector connecting the master control logic 18 and the microprocessor interface 28 to the external microprocessor, includes data lines D1–D3, an ALE strobe, a Read strobe, a Write strobe and a chip select (CS) line. A four line serial port (not shown) could be provided instead of the parallel port. A standard micro-wire port includes data input and output lines, D1 and D0, a clock line CK and a chip select line CS. Two 4-bit instruction registers are provided in the microprocessor interface 28. Logic control words loaded into the registers are decoded by means of two 4-bit command word decoders 111. The resulting output signal controls the individual control components of the master control logic 18.

By using a single, high accuracy buffer/amplifier 44 (FIGS. 4, 5 and 6) having a resistor 112 that can be switched into the buffer/amplifier circuit, various advantages are achieved. During the calibration phase the buffer/amplifier 44 operates with the commutator 59 closed to achieve a gain of one, thereby acting simply as a buffer. During the signal processing stage a gain of 5 can be achieved, when a suitable fixed internal resistor 112 is used, by opening the commutator 59 to switch in the resistor 112, and allowing the device 44 to operate as an amplifier to amplify the input signal. The increased amplification allows the full 14 bits of the counter 24 to be used, even when a very small sensor full scale signal, as small as 16 mV, is applied, thereby increasing the resolution of the ADC to 14-bits. Thus the device 44 has programmable gain. Since the full-scale signal is adjustable, no high accuracy component need be used. Any amplification error is automatically compensated for by the Programmable-dual-slope ADC (PDLADC) system. During the negative slope phase, when the reference voltage from the EEPROM is applied to the integrator 46, there is no need to amplify the signal. The commutator 59 is opened and the amplifier 44 serves as a buffer. It also allows a single 3V supply to be used and eliminates the need for a voltage doubler to obtain the necessary voltage range. In the embodiment illustrated in FIG. 4 the gain of the amplifier 44 is controlled by the value of the resistor 112. Typically this resistor is an internal resistor providing for a fixed selectable gain. Instead, an amplifier with a programmable gain, for example a 4-bit programmable gain, may be used. Yet a further option is to have a fixed external resistor that is chosen to select the appropriate gain depending on the sensor application.

It will be appreciated that after each pressure or temperature sensing cycle a neutral phase is incurred in which time the circuit is given the opportunity to stabilize prior to re-applying the off-set voltage to the capacitor 52. This stabilizing period can be reduced by means of the super charge technique illustrated in FIGS. 4, 5 and 6. Super charge switches 114 and 115 are briefly closed to allow large currents to be applied to various portions of the circuit 10 thereby rapidly stabilizing the circuit.

As mentioned above, the 4-bit digital-to-analog convertor 34 for adjusting the voltage or current source 86, and the 8-bit digital-to-analog convertor 22 for off-set rough adjustment and full-scale rough adjustment, are also included in the circuit 10.

In the embodiment illustrated in FIG. 2, a sensor-on switch 116 is provided. Moisture detectors may be included for turning the switch 116 off in the absence of moisture. In the presence of moisture the switch 116 is turned on and a flag is generated to alert the microprocessor of this fact. Clearly such a detector would be useful in a pressure gauge to be used for operation under water, in diving computers and the like. The switch 116 connected to a circuit 117 allows the circuit 10 to be operated in a power-down mode in which the R/C circuit is stopped, and only the sensor-on switch 116, which draws only 0.2 µA, remains activated. An internal resistor circuit with a current mirror (part of circuit 117) having a resistance of 2–3 MOhm is needed to detect the presence of fresh water on the switch 116.

An automatic Power-On Reset function is provided by the circuit 118 (FIGS. 2 and 3), which is connected internally (FIG. 2), or externally (FIG. 3) to an on chip capacitor (not shown).

A further feature incorporated in a preferred embodiment is that of a current saving mode in which current is supplied to the sensors only when the sensors are in a sensing mode and the signal is being integrated, i.e. the positive slope phase (approximately ⅓ of the entire A-D conversion time).

The circuit illustrated in FIG. 3 further includes various features that make it suitable for industrial applications in the use of process control. A plurality of current or voltage sources 26 is provided. One current or voltage source can be connected to be switchable, so as to supply power only during the sensing cycles, while another source can be permanently connected to the sensors. The use of a permanently connected current or voltage source allows other analog circuits such as programmable amplifiers to be connected to the sensors while insuring that a constant analog output is received from the sensors. This allows the sensors to be monitored at any time by the analog circuits connected thereto. In order to achieve this a plurality of lines is multiplexed to the sensors for connecting the additional analog circuits to the sensors. A digital volt meter feed back can be provided by means of pins 122 (DVM1/DVM2) in FIG. 3 to control the analog circuit. The on chip Voltage Regulator and Voltage Doubler 124 can generate the necessary plus/minus voltage output to drive analog circuitry and the IC itself by connection over a JFFET directly to +35V power supplies as used in many industrial applications. For example, if a programmable amplifier is connected, a feed back line may extend from the output of the amplifier for controlling the amplifier, to the inputs 122. The power supply of such external programmable amplifiers can also be supplied from the IC with its voltage regulator 124 as seen in FIG. 3. The circuit illustrated in FIG. 3 includes various other features such as a band gap reference, a voltage doubler and programmable $V_{DD}$-$V_{SS}$ as indicated generaly by the voltage regulator block 124.

It will be appreciated that although the circuits were described specifically for use in measuring pressure the concepts discussed will be applicable for measuring any other values that may be sensed with a resistive sensor. These include, for example, weight, force, temperature, pressure, acceleration, humidity, magnetic field, pH, conductivity, etc.

We claim:

1. An apparatus for measurement signal compensation comprising:

an analog-to-digital converter operating in a dual slope integration mode, the converter including an integrator having a first input port for selectively receiving either the analog measurement signal or a reference voltage, and a second input port for receiving a control voltage, the converter further including a comparator connected to an output of the integrator, and a counter for controlling the number of steps during the positive slope phase of integration;

a controller connected to the first input port of the integrator for providing the reference voltage to the integrator during a negative slope phase of integration; and an amplifier having a switchable gain, an output of the amplifier being connected to the first input port of the integrator, wherein the controller includes a microprocessor.

2. An apparatus of claim 1, wherein the controller includes a data memory connected to the microprocessor, and wherein the apparatus further comprises a digital-to-analog converter for producing the reference voltage in response to a digital value supplied from the data memory.

3. An apparatus of claim 2, wherein the memory is connected to the digital-to-analog converter and the data stored in the memory includes a digital off-set compensation value, a preprogrammed full-scale rough adjust value, and preprogrammed full-scale fine adjust values.

4. An apparatus of claim 3, wherein the digital off-set compensation value, and the preprogrammed full-scale rough adjust value each comprises an 8 bit word, and the preprogrammed full-scale fine adjust values comprise 12 bit words.

5. An apparatus of claim 4, wherein the reference voltage corresponds to the 8-bit digital full-scale rough adjust value supplied from memory to provide for full-scale rough adjust of the integrator.

6. An apparatus of claim 4, wherein full-scale fine adjust values are calculated by interpolation from the preprogrammed full-scale fine adjust values, and used for adjusting the number of steps counted by the counter.

7. An apparatus of claim 3, wherein the first input port of the integrator includes a capacitor which is charged to an off-set compensation voltage corresponding to the digital off-set compensation value.

8. An apparatus of claim 1, further comprising at least one sensor connected in an associated bridge circuit, wherein the measurement signal is derived from the at least one bridge circuit.

9. An apparatus of claim 8, further comprising a programmable current source or voltage source connected to one of the at least one sensor.

10. An apparatus of claim 9, wherein the apparatus includes a plurality of sensors and a switch for selectively connecting the current source or voltage source to any one of the plurality of sensors.

11. An apparatus of claim 9, wherein the programmable current source or voltage source includes a step selector.

12. An apparatus of claim 8, further comprising a plurality of current sources or voltage source connected to each sensor.

13. An apparatus of claim 12, wherein the programmable current sources or voltage source each includes a step selector.

14. An apparatus of claim 11, wherein the value of the step selector at a predetermined minimum temperature for which an output signal is obtained from the comparator is stored in memory.

15. An apparatus of claim 14, wherein the preprogrammed full-scale fine adjust values correspond to compensation values obtained for pre-determined temperatures and pressures.

16. An apparatus of claim 15, wherein the microprocessor is programmed to calculate temperature and pressure compensation values by interpolation using the preprogrammed full-scale fine adjust values stored in the data memory.

17. An apparatus of claim 4, further comprising a multiplexer connected between the memory and the digital-to-analog converter for transmitting either the off-set compensation value or the full-scale rough adjust value to the digital-to-analog converter.

18. An apparatus of claim 2, wherein the memory comprises an electrically erasable and programmable read-only memory device.

19. An apparatus of claim 1, wherein the amplifier comprises a buffer/amplifier having a lateral NPN buffer means for low noise characteristics.

20. An apparatus of claim 1, further comprising super charge switch means for rapidly stabilizing the apparatus during neutral phases of integration and when switching between different signals.

21. An apparatus for processing analog measurement signals comprising:

an analog-to-digital converter that includes a dual slope integrator operated in the negative slope phase with a full-scale rough adjust reference voltage;

a storage unit for storing a full-scale rough adjust reference value corresponding to the full-scale rough adjust reference voltage;

a digital-to-analog converter connected between the storage unit and the integrator; and a switchable gain amplifier connected to the integrator for amplifying the analog measurement signals during the positive slope phase of the integration.

22. An apparatus of claim 21, further comprising super charge switch means for rapidly stabilizing the apparatus during neutral phases of integration.

23. An apparatus of claim 21, wherein the switchable gain amplifier is a programmable gain amplifier.

24. An apparatus of claim 21, wherein the amplifier comprises a buffer/amplifier having a lateral NPN buffer means for low noise characteristics.

25. An apparatus of claim 21, wherein an off-set compensation value is stored in the storage unit, and the analog-to-digital converter includes an off-set compensation voltage storage capacitor for compensating, during a neutral phase of the integration, for the voltage off-set, the off-set compensation voltage storage capacitor receiving a voltage related to the off-set compensation value.

26. An apparatus of claim 21, further comprising a multiplexer having an output connected to the digital-to-analog converter, and an input connected to the storage unit.

27. An apparatus of claim 21, further comprising a microprocessor interface for connecting an external microprocessor.

28. An apparatus of claim 25, further including a controlling means for controlling the transmission of the off-set compensation value for the off-set compensation voltage storage capacitor, and the transmission of the full-scale rough adjust reference value.

29. An apparatus for processing analog measurement signals comprising:

an analog-to-digital converter that includes a dual slope integrator;

a counter means for controlling the number of integration steps during the positive slope phase of integration;

a storage unit for storing preprogrammed full-scale fine adjust values;

a controller for calculating specific compensation values from the preprogrammed full-scale fine adjust values, to control the number of integration steps of the counter; and a switchable gain amplifier connected to the integrator for amplifying the analog measurement signals during the positive slope phase of the integration.

30. An apparatus of claim 29, wherein the specific compensation values are calculated by interpolation from the preprogrammed full-scale fine adjust values.

31. An apparatus of claim 29, further comprising super charge switch means for rapidly stabilizing the apparatus during neutral phases of integration.

32. An apparatus of claim 29, wherein the switchable gain amplifier is a programmable gain amplifier.

33. An apparatus of claim 29, wherein the amplifier comprises a buffer/amplifier having a lateral NPN buffer means for low noise characteristics.

34. An apparatus of claim 29, further comprising a microprocessor interface for connecting an external microprocessor.

35. An apparatus of claim 29, further comprising a programmable clock connected to the counter means for adjusting the frequency of the counter means.

36. A method for measurement signal compensation, comprising:

providing an analog-to-digital converter that includes a dual slope integrator having an input port for receiving an analog measurement signal and a comparator connected to an output of the integrator;

providing, by means of a counter, a selectable time of integration during a positive slope phase of integration;

applying a full-scale rough adjust reference voltage to the input port of the integrator during a negative slope phase of integration; and adjusting the amplification of the signal applied to the input port of the integrator during the positive slope phase.

37. A method of claim 36, wherein the full-scale rough adjust reference voltage is applied to the input port under programmable microprocessor control.

38. A method of claim 36, further comprising:

providing, under programmable microprocessor control, a predetermined off-set compensation voltage to the input port of the integrator for setting the integration starting point.

39. A method of claim 37, wherein digital data is provided under control of a microprocessor from a data memory, and the data includes an off-set compensation value representative of the off-set compensation voltage, preprogrammed full-scale fine adjust values for adjusting the time of integration during the positive slope phase, and a preprogrammed reference value for use in providing the full-scale rough adjust reference voltage to the integrator.

40. A method of claim 39, wherein the off-set compensation value is converted to the off-set compensation voltage, and the reference value is converted to the full-scale rough adjust reference voltage in a digital-to-analog converter before being applied to the integrator.

41. A method of claim 39, further comprising a calibration phase, during which the preprogrammed full-scale fine adjust values and the preprogrammed reference value are stored in the data memory.

42. A method of claim 39, wherein the data memory comprises an electrically erasable and programmable read-only memory device.

43. A method of claim 37, wherein the off-set compensation voltage is applied to the integrator by charging a capacitor connected to the input port.

44. A method of claim 39, further including the step of calculating specific full-scale fine adjust values from the preprogrammed full-scale fine adjust values by interpolation.

45. A method of claim 44, wherein the interpolation is a polynomial interpolation using the equation $$Y = L0*Y0 + L1*Y1 + L2*Y2 + L3*Y$$

wherein L0, L1, L2 and L3 are:

$$L0 = \frac{(X-X1)*(X-X2)*(X-X3)}{(X0-X1)*(X0-X2)*(X0-X3)}$$

$$L1 = \frac{(X-X0)*(X-X2)*(X-X3)}{(X1-X0)*(X1-X2)*(X1-X3)}$$

$$L2 = \frac{(X-X0)*(X-X1)*(X-X3)}{(X2-X0)*X2-X1)*X2-X3)}.$$

46. A method of claim 44, wherein the preprogrammed full-scale fine adjust values reference values are preprogrammed compensation values obtained for various predetermined temperatures and pressures.

47. A method of claim 36, wherein the measurement signal is derived from a sensor in a bridge circuit, the method further comprising:

gradually increasing the current supplied to the bridge circuit at a predetermined minimum temperature, until a signal is obtained from the comparator, the magnitude of the current being representative of a component error compensation voltage.

48. A method of claim 47, wherein data corresponding to the current supplied to the bridge circuit is stored in the data memory as a component error compensation value.

49. A method of claim 39, further including the step of multiplexing the transmission of the digital data to a digital-to-analog converter for selectively providing to the digital-to-analog converter, the off-set compensation value or the preprogrammed reference value.

50. A method of claim 46, further comprising, providing a pressure sensor, wherein the preprogrammed full-scale fine adjust values are determined during the calibration phase by exposing the pressure sensor to predetermined temperature and pressure variations.

51. A method of claim 44, wherein the analog-to-digital converter is operated in a temperature sensing mode to obtain temperature measurements, and in a pressure sensing mode to obtain pressure measurements, the values obtained in one mode, being used in calculating the specific full-scale fine adjust value in the subsequent mode.

52. A method of claim 51, wherein the temperature sensing mode and pressure sensing mode are engaged at pre-determined intervals or by means of a control switch when desired.

53. A method of claim 44, wherein the analog-to-digital converter is operated in a temperature sensing mode and a pressure sensing mode, and wherein the method includes a current saving technique in which current is supplied to the sensor only during the positive slope phase of integration.

54. A method of claim 36, further comprising employing super charge techniques during neutral slope phases to facilitate a high rate of measurement signal compensations.

55. A method of claim 41, further comprising calibrating the clock to achieve a minimum predetermined integrator ramp height.

56. A method of claim 55 wherein the calibration of the clock includes adjusting the clock frequency to obtain a desired frequency and storing the desired frequency in the data memory.

57. A method of claim 44, wherein the digital-to-analog converter is operated in a power supply sensing mode at predetermined intervals or when desired to compensate for variations in power supplied to the converter.

58. A method of claim 57, wherein specific power supply compensation values are calculated by interpolation from preprogrammed power supply compensation values stored in the data memory, for compensating for variations in the power supplied to the converter.

* * * * *